US006654770B2

(12) United States Patent
Kaufman

(10) Patent No.: US 6,654,770 B2
(45) Date of Patent: Nov. 25, 2003

(54) AUTOMOBILE SAFETY AND MAINTENANCE INFORMATION SYSTEMS AND METHODS AND RELATED SERVICES

(75) Inventor: Ronald Robert Kaufman, Tucson, AZ (US)

(73) Assignee: Mycarstats.com, LLC, Tucson, AZ (US)

( * ) Notice: Subject to any disclaimer, the term of this patent is extended or adjusted under 35 U.S.C. 154(b) by 0 days.

(21) Appl. No.: 10/041,625

(22) Filed: Jan. 10, 2002

(65) Prior Publication Data

US 2003/0130989 A1 Jul. 10, 2003

(51) Int. Cl.[7] .............................................. G06F 17/30
(52) U.S. Cl. ............................. 707/200; 707/1; 340/825
(58) Field of Search .............................. 707/1, 10, 200; 340/457, 825, 902, 438; 702/177; 701/29, 33, 35; 705/1, 26, 27, 37, 400; 709/230

(56) References Cited

U.S. PATENT DOCUMENTS

| | | | |
|---|---|---|---|
| 4,404,639 A | 9/1983 | McGuire et al. ............ 364/35 |
| 5,363,316 A | * 11/1994 | Spencer .................... 702/177 |
| 5,493,490 A | 2/1996 | Johnson ...................... 364/26 |
| 5,541,840 A | 7/1996 | Gurne et al. ................ 701/33 |
| 5,754,939 A | 5/1998 | Herz et al. ................. 455/4.2 |
| 5,999,908 A | 12/1999 | Abelow ....................... 705/1 |
| 6,006,201 A | 12/1999 | Berent et al. ............... 705/27 |
| 6,105,003 A | 8/2000 | Morohashi et al. .......... 705/26 |
| 6,112,246 A | 8/2000 | Horbal et al. .............. 709/230 |
| 6,125,356 A | 9/2000 | Brockman et al. ........... 705/37 |
| 6,263,322 B1 | 7/2001 | Kirkevold et al. .......... 705/400 |
| 6,285,932 B1 | 9/2001 | de Bellefeuille et al. ..... 701/33 |
| 6,308,120 B1 | 10/2001 | Good ......................... 701/29 |
| 6,311,162 B1 | 10/2001 | Reichwein et al. ............ 705/1 |
| 6,314,422 B1 | 11/2001 | Barker et al. ............... 707/10 |
| 6,339,736 B1 | 1/2002 | Moskowitz et al. .......... 701/29 |
| 6,356,822 B1 | 3/2002 | Diaz et al. .................. 701/33 |
| 6,359,570 B1 | 3/2002 | Adcox et al. ............... 340/902 |
| 6,362,730 B2 | 3/2002 | Razavi et al. .............. 340/438 |
| 6,480,105 B2 | * 11/2002 | Edwards ................... 340/457 |

OTHER PUBLICATIONS

Marketdrive Interactive: Guest Tour, http://www.marketdriveinteractive.com, printed Mar. 28, 2002, 19 pages.
Fairfax Volkswagen offers you a Free personalized car web site!, http://www.fairfaxvw.com, printed Mar. 28, 2002, 1 page.

(List continued on next page.)

Primary Examiner—Sanjiv Shah
(74) Attorney, Agent, or Firm—Mintz Levin Cohn Ferris Glovsky and Popeo PC

(57) ABSTRACT

A computer system and method that provides users with vehicle related information and services. In one aspect, the system provides a vehicle selector that enables a user of the system to select a vehicle by selecting, at the least, a vehicle year, make and model. After the user selects a vehicle, the system is operable to display a summary report page for the selected vehicle. The summary report page includes summary information concerning the selected vehicle. Preferably, the system displays the summary report page without any charge to the user. If the user wants to see detailed information concerning the selected vehicle, the user must purchase a virtual key for the vehicle.

40 Claims, 20 Drawing Sheets

OTHER PUBLICATIONS

Recall Notices and Technical Service Bulletins (TSBs) from ALLDATA, printed from http://www.alldata.com/recalls/, printed Jan. 30, 2002 1 page.

Office of Defects Investigation, Technical Service Bulletins Database, printed from http://www.nhtsa.dot.gov/cars/problems/tsb/Index.cfm, printed Jan. 30, 2002, 2 pages.

British Leyland, Technical Service Bulletins, printed from http://www.triumphsonly.com/bulletin/, printed Jan. 30, 2002, 6 pages.

Miata Service Bulletins, printed from http://www.miata.net/garage/tsb/, printed Jan. 30, 2002, 2 pages.

Motor Age: America's Leading Automotive Service e–Zine!, printed from http://www.motorage.com/tsb/, printed Jan. 30, 2002, 3 pages.

Neon Technical Service Bulletins, printed from http://www.neons.org/neontsb/, printed Jan. 30, 2002, 1 page.

Technical Service Bulletins, printed from http://www.vmrintl.com/All%20titles/Technical%20Service%20Bulletins.htm, printed Jan. 30, 2002, 1 page.

Technical Service Bulletin Titles, printed from http://www.mobil1.com/care/advanced/tsb/results.jsp?vuid=35467&x=97&y=7, printed Apr. 25, 2002, 2 pages.

Recalls, Technical Service Bulletins, and Other Good Stuff, printed from http://www.edmunds.com/ownership/safety/recalls/45762/article.html, printed Jan. 30, 2002, 1 page.

Automotive Technical Service Bulletins, printed from http://www.4door.com, printed Jan. 30, 2002, 3 pages.

Recalls and Technical Service Bulletins: Finding and Fixing Ongoing Problems with Your Car or Truck, printed from http://www.womanmotorist.com/ftrs/sk–tsbs–01.shtml, printed Jan. 30, 2002, 2 pages.

Xterra Owners Club, printed from http://www.xterraownersclub.com, printed Jan. 30, 2002, 2 pages.

ALLDATA DIY—Online Diagnostic and Repair Information for Vehicle Owners, printed from http://www.alldata.com/diy/handshake.html, printed Jan. 30, 2002, 2 pages.

Gemini Recalls & Technical Service Bulletins, printed from http://www.gemini.goodyear.com/auto/recall.html, printed Jan. 30, 2002, 2 pages.

Automotive Recalls and Technical Service Bulletins for 1996 Jaguar XJ–S Convertible L6–3980cc 4.0L, printed from http://www.alldata.com/TSB/30/96301404.html, printed Jan. 30, 2002, 3 pages.

Technical Service Bulletins (TSBs), printed from http://www.scuderiaciriani.com/rx7/TSB.html, printed Jan. 30, 2002, 2 pages.

Automotive Recalls and Technical Service Bulletins (TSBs), printed from http://patriot.net/~bmcgin/tsb.html, printed Jan. 30, 2002, 7 pages.

You, Your Vehicle and the Technical Service Bulletin (TSB), printed from http://www.edmunds.com/ownership/maintenance/articles/44745/article.html, printed Jan. 30, 2002, 7 pages.

AutoSpeak Shade Tree Mechanical Recalls and Technical Service Bulletins, printed from http://www.autospeak.com/shade.htm, printed Jan. 30, 2002, 2 pages.

SaturnFans.com: Rate Technical Service Bulletins Database, printed from http://www.saturnfans.com/cgi–bin/directory/rate.cgi?ID=1395, printed Jan. 30, 2002, 1 page.

Vehicle Vitals; Technical Service Bulletins, printed from http://www.icarumba.com/mycarumba/vehiclevitals, printed Nov. 19, 2001, 2 pages.

Automotive Car Care Maintenance, printed from http://popularmechanics.com/automotive/sub care maint/, printed Jan. 30, 2002, 2 pages.

Microsoft CarPoint Personal Auto Page, printed from http://ownership.carpoint.msn.com/ownership/NewUser.asp?, printed Jan. 30, 2002, 1 page.

Autos Main Page at Netscape, printed from http://autos.netscape.com/autos/main.tmpl, printed Jan. 30, 2002, 2 pages.

Autoweb Service, printed from http://autoweb.lycos.com/content/own/service/index.cfm, printed Jan. 30, 2002, 2 pages.

Yahoo! Autos, printed from http://autos.yahoo.com/myauto/, printed Jan. 30, 2002, 1 page.

Acme Outfitters Technical Service Bulletins and Recalls, printed from http://www.acme–outfitters.com/library/tsbs.html, printed Jan. 30, 2002, 1 page.

Recalls and Technical Service Bulletins, printed from http://www.shotimes.com/SHOOrecalls.html, printed Jan. 30, 2002, 1 page.

Pricing Information on Quotes from My Car Girl, printed from http://mycargirl.com/vehicle repair quotes.html, printed Jan. 30, 2002, 2 pages.

AUTOPEDIA—The Automotive Encyclopedia, printed from http://autopedia.com/index.html, printed Jan. 30, 2002, 6 pages.

Totallyauto.com—The Source for Information about More. . . , printed from http://totallyauto.com/, printed Jan. 30, 2002, 2 pages.

Technical Service Bulletins, printed from http://members.aol.com/atsgmo2/bull.htm, printed Jan. 30, 2002, 1 page.

Automotive Repair Information for Consumers, printed from http://www.carcrisis.com/, printed Jan. 30, 2002, 2 pages.

HotBot Open Directory/Recreation/Auto, printed from http://dir.hotbot.lycos.com/Recreation/Autos/, printed Jan. 30, 2002, 2 pages.

CarSmart.com Service, printed from http://www.carsmart.com/content/own/service/, printed Jan. 30, 2002, 2 pages.

AOL Search: Recreation/Autos/Repair, printed from http://search.aol.com/cat.adp?from=SEARCHHOME&id=8305, printed Jan. 30, 2002, 7 pages.

ALLDATA LLC—Leader in Automotive Information, printed from http://www.alldata.com/, printed Nov. 19, 2001, 4 pages.

CARFAX Home Page, printed from http://www.carfax.com, printed Nov. 19, 2001, 1 page.

MSN Carpoint Side–By–Side Compare, printed from http://carpoint.msn.com/compare, printed Nov. 19, 2001, 4 pages.

MSN CarPoint Personal Auto Page, printed from http://ownership.carpoint.msn.com/ownership/Home.asp, printed Nov. 19, 2001, 2 pages.

Autobytel Autobytel.com—changing the Way America Buys Cars. . . Again, printed from http://www.autobytel.com/content/own/garage, printed Oct. 10, 2002, 6 pages.

You, Your Vehicle and the Technical Service Bulletin (TSB), printed from http://www.edmunds.com/ownership/maintenance/articles/44745/article.html, last updated Apr. 17, 2001, 7 pages.

The Secret Warranty: (AKA) After Warranty Assistance (AWA), printed from http://www.edmunds.com/advice/fiw/articles/43008/article.html, last updated Apr. 17, 2001, 2 pages.

* cited by examiner

Below is a Summary Report for the vehicle you selected:

1967 Ford Mustang # of TSBs  127  (Go) ~521 # of Recall Notices  1  (Go) ~522
3
# of Consumer Complaints  234  (Go) ~523 # of Investigations  3  (Go) ~524

502

View Summary Report for Last:
○ 30 days  ○ 60 days  ○ 90 days  ○ All
563
(All above information is current as of 11/30/2001)

CUSTOM REPORT

Interior Systems

☐ Bulletin #: 000850011

SOME CUSTOMERS MAY COMMENT ON A POPPING OR SNAPPING SOUND WHEN DOWNWARD PRESSURE IS APPLIED TO THE REAR SEAT CUSHION AT EITHER OUTBOARD SEATING POSITION. SOME VERTICAL CUSHION MOVEMENT MAY ACCOMPANY THIS SOUND. *TT

FIG. 8

1967 FORD MUSTANG

The table below shows the number of mechanical and safety issues and concerns that have been found in the database.

[Key: INACTIVE]  [Notifications: OFF]

( View Detailed Report )  ( Edit )  ( My Garage )  ( Purchase Key )

Bulletins   Recalls   Investigations   Complaints

| Component classification | Reports |
|---|---|
| Brakes | 0 |
| Electrical System | 0 |
| Emergency Parking Brake | 0 |
| Engine and Engine Cooling System | 0 |
| Equipment | 0 |
| Fuel, Exhaust, Emissions Control | 0 |
| Heater, Air Conditioner, Ventilation | 2 |
| Interior Systems | 4 |
| Lighting and Communications Systems | 0 |
| Power Train | 0 |
| Steering | 0 |
| Structure | 0 |
| Suspension, Wheels, Tires | 1 |
| Visual Systems | 0 |
| Total Reports | 7 |

Enter Keywords: [_____]   ( Search )

View Summary Report for Last:
○ 30 days  ○ 60 days  ○ 90 days  ○ All (All above information is current as of 11/30/2001)

Compare Two Vehicles using the Vehicle Selectors below:

Vehicle 1
  Vehicle Year
  [2002 ▾]
  Vehicle Make
  [Make ▾]
  Vehicle Model
  [Model ▾]

Vehicle 2
  Vehicle Year
  [2002 ▾]
  Vehicle Make
  [Make ▾]
  Vehicle Model
  [Model ▾]

( Compare ) — 1690

FIG. 16

1700 

Specification Comparison

| | Vehicle 1 | Vehicle 2 |
|---|---|---|
| MSRP | $27,800 | $35,000 |
| Invoice | $25,378 | $33,180 |
| Transmission | Automatic | Manual (5 speed) |
| Drive | Rear | Front |
| Cruise Control | Standard | Standard |
| Anti-Theft | Standard | Standard |
| Air Conditioning | Standard | Standard |
| Climate Control | Yes | No |
| Power Locks | Standard | Standard |
| Remote Trunk Release | Standard | Standard |
| Warranty | 5yr/50,000miles | 2yr/24,000miles |
| Navigational Systems | Standard | Not Available |
| Power Windows | Standard | Standard |
| Tinted Glass | Standard | Standard |
| Elect Front Seat Adjust | Yes | No |
| Heat Front Seat | No | No |
| Radio | Yes | |
| Cassette | Yes | Yes |

Mechanical Issue/Safety Comparison

| | Vehicle 1 | Vehicle 2 |
|---|---|---|
| # of TSBs issued | 289 | 123 |
| # of Consumer Complaints | 128 | 78 |
| # of NHTSA investigations | 3 | 0 |
| # of Recall Notices | 0 | 2 |

FIG. 17

AUTOMOBILE SAFETY AND MAINTENANCE INFORMATION SYSTEMS AND METHODS AND RELATED SERVICES

BACKGROUND OF THE INVENTION

1. Field of the Invention

The invention relates to a systems and methods for providing to users automobile safety and maintenance information and related services.

2. Discussion of the Background

Vehicle owners and people shopping for vehicles are or at least should be interested in various types of vehicle safety and maintenance information. Examples of information of interest include recall information, technical service bulletins (TSBs), NHTSA investigations, consumer complaints and other safety and maintenance information. It is currently difficult for people to access this information conveniently, to stay up to date on changes to this information and to sort through the relevant/irrelevant material once it is accessed.

Various web sites exist that enable a user to retrieve bits of automobile safety and maintenance information. Some of these sites require a user to continuously monitor the site to maintain up to date information. Some of the sites provide only limited information, thus requiring the user to visit multiple sites to obtain a "complete" set of relevant information. Many of the sites do not present the information in a very use friendly format. For example, some sites merely present information in chronological order. These and other drawbacks exist in known systems. These and other difficulties in accessing and using safety and maintenance information is a drawback.

Another problem for car owners is they sometimes forget to take their vehicle back to the dealer for scheduled maintenance and they sometimes forget that a vehicle's warranty is about to expire. These problems can lead to well recognized adverse consequences for the vehicle owner.

Other drawbacks and disadvantages of these web sites exist.

SUMMARY OF THE INVENTION

The present invention provides computer systems and methods that provide automobile safety and maintenance information and related services.

According to one embodiment, a computer implemented system comprises a website that provides a vehicle selector that enables a user of the system to select one or more vehicles (e.g., by selecting one or more of a vehicle year, make and model), and retrieve various types of safety and/or maintenance information for selected vehicles. Although the invention is not so limited, the information retrieved may include one or more of TSBs, consumer complaints, recall notices and NHTSA investigations. According to one embodiment, the retrieved information is displayed in a user friendly manner. For example, according to one aspect of the invention, the system is operable to display a summary report page for the selected vehicle. The summary report page preferably includes summary information relevant to the selected vehicle. Preferably, the system displays the summary report page without any charge to the user.

Advantageously, in one embodiment, the summary report page includes a list of vehicle report types and, for each vehicle report type listed, the summary report page includes the number of reports or other items found for each report type or those that have been issued or submitted within a given period of time. In one embodiment, the summary report page includes a list of four vehicle report types: (1) Technical Service Bulletins (TSBs); (2) consumer complaints; (3) NHTSA investigations; and (4) recall notices.

From the summary report page, the system allows the user to drill down to see more information about any of the report types relevant to the selected vehicle. For example, if the user selects to see more information about the TSBs, the system will display to the user a TSB summary report page. In this example, the TSB summary report page shows a list of vehicle component classifications (also referred to as "vehicle component" for short), and, for each vehicle component classification in the list, the TSB summary report page shows the total number of TSBs stored in the system's database that pertain to the selected vehicle and the vehicle component classification. Alternatively, instead of showing the total number of TSBs stored in the database that pertain to the selected vehicle and the vehicle component, the summary report shows the number of TSBs stored in the database that have been issued within the last X days and that pertain to the selected vehicle and the vehicle component, where X can be a number greater than zero.

The system also allows the user to indicate that he wants to see a detailed report concerning the selected vehicle, wherein the detailed report includes content from one or more of the vehicle reports that pertain to the selected vehicle. For example, from the TSB summary report page the user can activate a hyperlink or button or other selection device that indicates that user wants to see a detailed report page that pertains to the selected vehicle and that contains information from TSBs. In the above example, the system, in response to receiving the indication from the user, retrieves content from one or more TSBs that have been submitted to the NHTSA within a given time period and that concern the selected vehicle and displays the content to the user. Preferably, however, the system charges the user a set amount of money prior to displaying the detailed report page to the user. The user may be charged each time a detailed report page is generated for the user or may be charged a subscription fee that enables the user to view as many detailed reports concerning a particular vehicle (i.e., year, make and model) as the user likes within a set period of time.

From the detailed report page, the system enables the user to create a custom report. That is, the system enables the user to select one or more of the reports that are included in the detailed report page. Once the user has selected the one or more reports, the user can indicate that he would like the system to create a custom report based on the selected reports. In response to receiving the indication from the user, the system creates a custom report based on the reports selected by the user. The system allows the user to print download and/or electronically forward a copy of the custom report. The custom report includes information from the one or more reports selected by the user.

A further advantage of the system is that it allows a user to register with the system. The system provides to registered users certain functionality that is not available to non-registered users. If the user indicates the he would like to register with the system, the system displays a registration page to the user. The registration page prompts the user to input, at the least, an e-mail address and a password. The password selected by the user and the e-mail address are stored in the database. Additionally, the system associates a virtual garage with the user (i.e., the user's e-mail address). In one implementation, the virtual garage may be a relational database table, linked list, or other data structure for storing a set of related items.

A feature provided by the system to registered users is the ability for the registered user to add vehicles to the virtual garage that is associated with the user. To add a vehicle to the virtual garage, the user specifies the vehicle by using the vehicle selector provided by the system to select a vehicle make, a vehicle model, and year (e.g., the user selects a 1967 Ford Mustang) and then instructs the system to add the specified vehicle to the virtual garage. Additionally, any time the user logs into the system using the user identifier and password and selects a vehicle using the vehicle selector provided by the system, the selected vehicle may be automatically added to the user's virtual garage.

For a registered user, the system provides a vehicle chooser that enables the user to choose a vehicle that is in the user's virtual garage. The system is also operable to provide a vehicle information input page that enables the user to input vehicle related information concerning the chosen vehicle. For example, the vehicle information input page enables a user to input into the system information, such as, but not limited to: a date of purchase, the number of miles on the vehicle, the date when the vehicle's oil was changed last, the date when the tires where last rotated, the date and/or mileage when the vehicle's warranty expires, an estimate of the average number of miles per year that are put on the vehicle, and other information concerning the vehicle. Additionally, the information input page enables a user to specify an e-mail address, telephone number, street address, or other address at which the user would like to receive any notifications concerning the chosen vehicle that are sent by the system. The notifications that the system is operable to send are described below. After the user inputs the vehicle related information and address information, if any, for the chosen vehicle, the system is operable to store the information in the database and associate the information with the chosen vehicle.

A further feature of the system is that the system enables the user to specify whether he would like to subscribe to a basic notification service that sends to the user notifications concerning one or more vehicles in the user's virtual garage that the user has selected. In one embodiment, under the basic notification service, the user may elect to receive any combination of user selected notifications, including one or more of: basic summary report notifications concerning mechanical and safety issues related to the selected vehicles, basic vehicle maintenance reminder notifications concerning the selected vehicles, basic warranty expiration reminder notifications concerning the selected vehicles, basic alert notifications concerning the selected vehicles and other notifications.

If the user elects to receive the basic summary report notifications for a vehicle in his virtual garage, then the system at scheduled intervals or upon the trigger of a condition sends to the user a summary report concerning the vehicle. The summary report may include the same type of summary information as that which is included in a summary report page, which was described above, or other information.

If the user elects to receive the basic vehicle maintenance reminder notifications, then the system sends, at scheduled times or upon triggered conditions, notifications to the user that remind the user that he should take his vehicle into the shop for scheduled maintenance. For most vehicles, the manufacturer of the vehicle recommends that certain maintenance be performed at certain times or when certain events occur. For example, a manufacturer may recommend that the oil be changed about every 5,000 miles.

If the user selects to receive the basic warranty expiration reminder notifications for a vehicle in the user's virtual garage, then the system sends, at the appropriate point in time, a notification to the user that reminds the user that the vehicle's warranty is about to expire. In one embodiment, the system uses vehicle related information (e.g., year car was purchased and mileage shown on the odometer) and warranty terms (e.g., 2 year/24,000 mile warranty term) that were inputted by the user to determine the appropriate point in time in which to send the warranty expiration notification. In another embodiment, the system uses vehicle related information that was inputted by the user and warranty terms obtained from a third party database to determine the appropriate point in time in which to send the warranty expiration notification. The warranty expiration notification may include information about purchasing an extended warranty and may contain hyperlinks to affiliated vendors of such warranties. This feature makes it less expensive for a user to purchase an extended warranty before the original warranty expires.

If the user selects to receive the basic alert notifications for a vehicle in the user's virtual garage, the system periodically determines whether a report (e.g., a TSB, recall notice, consumer complaint, or investigation report) concerning the vehicle has been submitted or issued since a given point in time and, immediately or soon after determining that such a report has been submitted or issued, transmitting a notification to the user, wherein the notification informs the user that the report has been submitted and may include content from the report. The user can configure the system to send alerts only if a certain type of report has been submitted or issued. For example, one user may only want to receive an alert notification if the vehicle has been recalled (i.e., a recall notice was issued), whereas another user may want to receive an alert notification if a recall notice or TSB has been issued.

In one embodiment, the above described basic notification service is provided free of charge to all registered users of the system. In another embodiment, a user must pay a fee to receive the basic notification service. In still another embodiment, the above described basic notification service is provided free of charge to all registered users of the system and the registered users have an option to subscribe for a fee to an enhanced notification service, which is described below. In still another embodiment both the enhanced notification service and the basic notification service are provided free of charge.

In one embodiment, the system is operable to provide the user an enhanced notification service. Under the enhanced notification service, the user may elect to receive any combination of: enhanced summary report notifications, enhanced vehicle maintenance reminder notifications, enhanced warranty expiration reminder notifications, and enhanced alert notifications.

The enhanced summary report notifications for a vehicle include the same information that is included in the basic summary report notifications plus additional information. The additional information may include content from recently issued reports concerning the vehicle. For example, an enhanced summary report notification may include a summary report as described above plus content from one or more TSBs, recall notices, consumer complaints, and/or NHTSA investigation reports that were issued since the last time a summary report notification was sent to the user. In this way, the user is automatically kept informed of mechanical and/or safety issues concerning his vehicle.

The enhanced vehicle maintenance reminder notifications for a vehicle include the same information that is included in the basic vehicle maintenance reminder notifications plus additional information. The additional information may include information that informs the user of common mechanical issues that the user should ask the repair shop to check and/or content from recently issued reports concerning the vehicle.

The enhanced warranty expiration reminder notifications for a vehicle include the same information that is included in the basic warranty expiration reminder notifications plus additional information. The additional information may include information that informs the user of common mechanical issues that the user should ask the repair shop to check and/or content from recently issued reports concerning the vehicle.

The enhanced alert notifications for a vehicle include the same information that is included in the basic alert notifications plus additional information. The additional information may include the name and address of the nearest repair shops where the vehicle may be taken to get fixed and/or a hyperlink to web page from which the user can schedule an appointment with the repair shops. The additional information may also include the contents of the recall notice.

All of the basic and enhanced notifications mentioned above can be sent in any suitable format to any suitable user terminal device, e.g., via e-mail, regular mail, facsimile, cell phone, telephone, PDA, pager and/or to any other suitable user terminal device, depending on how the user has personalized the notification service.

Another feature of the system is that the system is operable to enable the user to compare two or more vehicles to each other. This is a useful feature if the user is in the market to buy a new or used vehicle and at other times. For example, the system enables the user to select a first vehicle by one or more of year, make, and model, and select a second vehicle by one or more of year, make and model. After the user makes his selections, the system displays summary information for the first selected vehicle and summary information for the second selected vehicle. The summary information for each vehicle is displayed in such a way that the user can easily compare the summary information for the first vehicle to the summary information for the second vehicle. The summary information may be on a per report or per component basis. For example, the summary information for a vehicle may show the number of TSBs, consumer complaints, recall notices, and investigations that have been submitted for the vehicle. Additionally, the summery information may show the number of TSBs or other report that pertain to each vehicle component.

To provide the features mentioned above, the system may comprise a web site comprising a database of safety and maintenance information that is created automatically and/or manually. For example, the website may comprise software that obtains vehicle reports from one or more third parties. The reports may include TSBs, complaints submitted by consumers, reports regarding vehicle investigations, recall notices, and other vehicle reports. For example, in one embodiment, the software obtains TSBs, consumer complaints, investigation reports, and recall notices from databases provided by the NHTSA.

In one embodiment, the software performs a process that includes: periodically (weekly, monthly, etc.) obtaining from one or more third parties vehicle reports that have been issued within the last X days; storing the obtained reports in a database or other storage medium; for each obtained report, extracting from the report various components of the report, including one or more of the date of the report, the vehicle(s) to which the report pertains, the vehicle components to which the report pertains, the type of report, the source of the report, and other information; and using the system's vehicle report database to associate each obtained report with the components of the report. The software may be further operable to execute scheduled events (e.g., summary report notifications, warranty expiration reminder notifications, etc.) and triggered events (e.g., alert notifications).

In another aspect of the invention, the invention provides a method that is designed to be performed by a vehicle owner (also referred to as "user") who is experiencing vehicle trouble with a component of his vehicle. The method includes: using a communication device to connect to an on-line vehicle information system after noticing that there is something wrong with the user's vehicle; communicating to the on-line system the vehicle's make, model, and year; receiving from the on-line system a summary report pertaining to the make, model, and year specified by the user; examining the summary report to determine whether the summary report indicates that one or more mechanical and/or safety issues have been reported for the component with which the user is experiencing trouble; if it is determined that one or more mechanical and/or safety issues have been reported for the component in issue, then purchasing a virtual key for the specified vehicle if the user does not already possess an active virtual key for the specified vehicle and requesting to see detailed information concerning the one or more reported mechanical and/or safety issues; receiving one or more records of information, wherein each of the one or more records of information includes information concerning one of the one or more reported mechanical and/or safety issues; selecting one or more of the one or more information records; sending a request to the on-line system to create a custom report based on the selected information records; receiving the custom report from the on-line system; printing a copy of the custom report; and taking the vehicle and the custom report to a vehicle repair shop.

In another aspect of the invention, the invention provides a method that is designed to be performed by a person (also referred to as "user") who is interested in purchasing a particular vehicle. The method includes: using a communication device to connect to an on-line vehicle information system; communicating to the on-line system the particular vehicle's make, model, and year; receiving from the on-line system a summary report pertaining to all cars of the make, model, and year specified by the user; examining the summary report to determine whether the summary report indicates that one or more mechanical and/or safety issues have been reported for the particular vehicle; if it is determined that one or more mechanical and/or safety issues have been reported, then purchasing a key for the specified vehicle if the user does not already possess an active key for the specified vehicle and requesting to see detailed information concerning the one or more reported mechanical and/or safety issues; receiving one or more records of information, wherein each of the one or more records of information includes information concerning one of the one or more reported mechanical and/or safety issues; selecting one or more of the one or more information records; sending a request to the on-line system to create a custom report based on the selected information records; receiving the custom report from the on-line system; printing a copy of the custom report; and using the custom report as a negotiation tool if and when the user negotiates to purchase the particular vehicle.

Another method, according to the present invention, for assisting a user in purchasing a vehicle includes the steps of: connecting to an on-line vehicle information system; selecting a vehicle compare feature provided by the on-line system, wherein the compare feature allows the user to select two or more vehicles; selecting a first vehicle that the user is interested in purchasing; selecting a second vehicle that the user is interested in purchasing; communicating the vehicle selections to the on-line system; and receiving from the on-line system a comparison report, wherein the comparison report includes information concerning the specifications of the first vehicle and information concerning the specifications of the second vehicle, the comparison report also includes information that indicates the number of mechanical and/or safety issues for the first vehicle that have been reported within a given time period and information that indicates the number of mechanical and/or safety issues for the second vehicle that have been reported within the given time period. In one embodiment, the comparison report includes information that indicates the number of TSBs, recall notices, investigation reports, and/or consumer complaints for the first and second vehicles that have been submitted or issued within the given time period. In another embodiment, the comparison report compares the two vehicles on per component basis by showing summary report information for each vehicle component system. For example, the report may show that 10 consumer complaints concerning the first vehicle's braking system have been submitted and only 1 consumer complaint concerning the second vehicle's braking system has been submitted.

In another aspect, the invention provides a method that includes the following steps: providing a system that is publicly accessible; enabling a user who connects to the system to select a vehicle by year, make, and model; displaying for free to the user a summary report regarding the vehicle selected by the user; enabling the user to purchase a virtual key for the selected vehicle; receiving an indication from the user that the user desires to view a detailed report regarding the selected vehicle; determining whether the user has an active, virtual key for the selected vehicle; displaying the detailed report to the user in response to receiving the indication if it was determined that the user has an active, virtual key for the selected vehicle; enabling the user to select one or more entries from the detailed report; creating a custom report based on the one or more entries selected by the user; and displaying the custom report so that the user may examine the custom report.

Further steps of the method include some or all of the following steps: enabling the user to register with the system; prompting the user to enter an email address and password as part of the registration process; associating a virtual garage with the user's email address; enabling the user to select one or more vehicles and adding them to his virtual garage; for each vehicle in the garage, enabling the user to input information concerning the vehicle (such as the number of miles on the car, the last time the car's oil was changed, the date and/or mileage when the car's warranty expires, the date vehicle was purchased, and other information concerning the vehicle); for each vehicle in the garage, enabling the user to specify that he would like to receive free notifications concerning the vehicle; for a vehicle in the user's garage for which the notification service is enabled, periodically sending to the user a notification concerning the vehicle; for a vehicle in the user's garage for which a notification service is enabled and for which a warranty is close to expiring, sending a notification that reminds the user that the warranty is about to expire (the notification may include (a) information about purchasing an extended warranty, (b) a hyperlink to an affiliated vender of extended warranties; (c) information about common mechanical issues that the user may want to have checked by a mechanic while the car is still under warranty and (d) other useful vehicle related information); periodically determining if a report (e.g., a TSB, recall notice, consumer complaint, or investigation report) concerning one of the vehicle's in the user's virtual garage has been submitted or issued since a given point in time and, immediately or soon after determining that such a report has been issued, transmitting a notification to the user, wherein the notification informs the user that the report has been submitted and may include content from the report; and providing various subscription levels, for example, all subscribers receive notifications and other basic services, but only premium service level subscribers can receive detail and custom reports and other premium services. Additionally, the price of premium service level subscriptions can be based on the number of cars that the user wants to have covered by the service.

The above and other features and advantages of the present invention, as well as the structure and operation of various embodiments of the present invention, are described in detail below with reference to the accompanying drawings.

BRIEF DESCRIPTION OF THE DRAWINGS

The accompanying drawings, which are incorporated herein and form part of the specification, illustrate various embodiments of the present invention and, together with the description, further serve to explain the principles of the invention and to enable a person skilled in the pertinent art to make and use the invention. In the drawings, like reference numbers indicate identical or functionally similar elements. Additionally, the left-most digit(s) of a reference number identifies the drawing in which the reference number first appears.

FIG. 5 illustrates a user interface that includes a summary report according to one embodiment.

FIG. 7 illustrates a user interface for displaying a detailed report according to one embodiment.

FIG. 8 illustrates an example custom report.

FIG. 13 illustrates a user interface that includes a summary report according to an embodiment.

FIG. 16 illustrates an example user interface for enabling a user to compare two vehicles.

FIG. 17 illustrates an example comparison report.

DETAILED DESCRIPTION OF THE PREFERRED EMBODIMENTS

While the present invention may be embodied in many different forms, there is described herein in detail an illustrative embodiment with the understanding that the present disclosure is to be considered as an example of the principles of the invention and is not intended to limit the invention to the illustrated embodiment.

Figure 1:
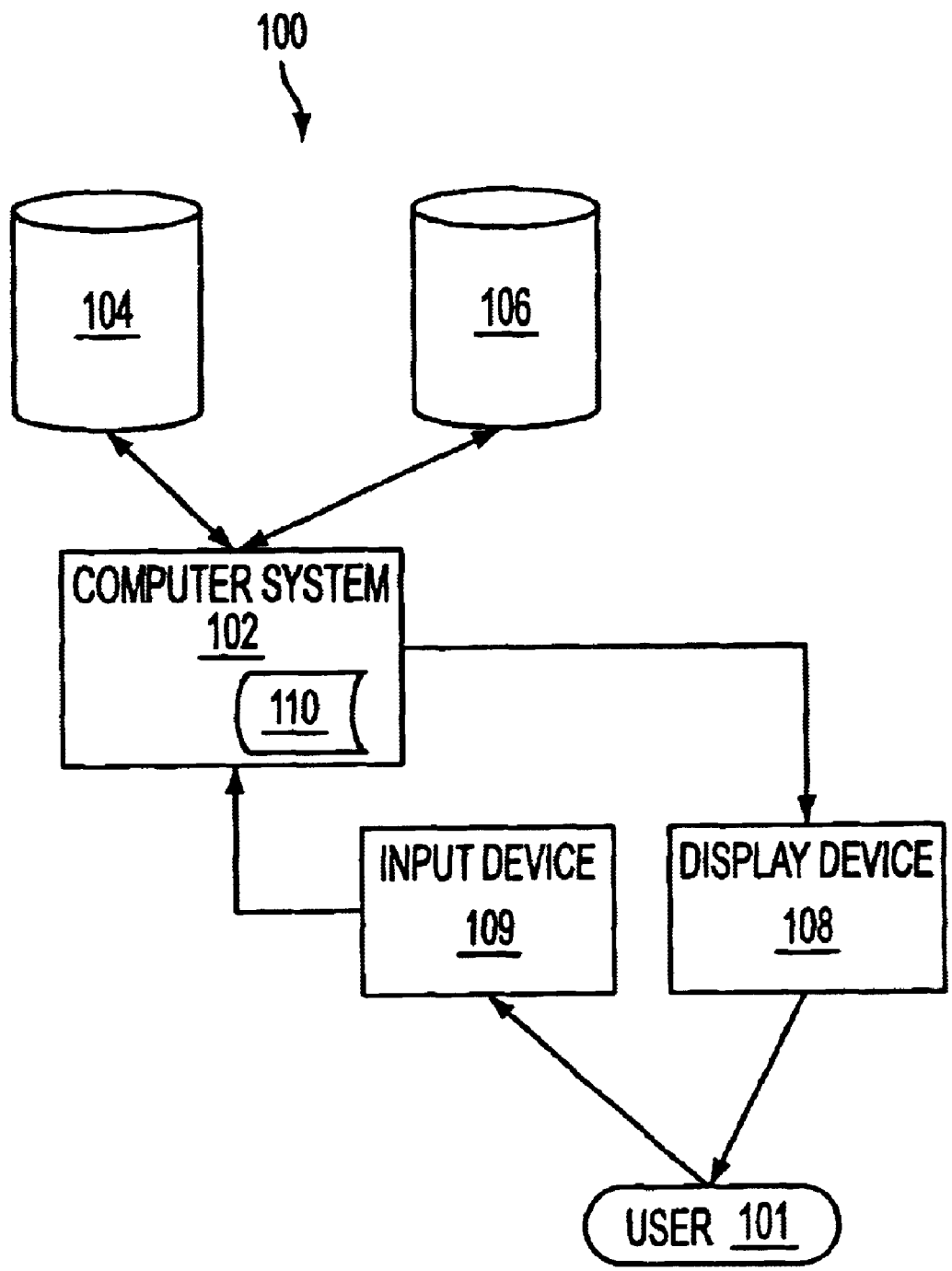
FIG. 1 is a functional block diagram of a vehicle information system according to one embodiment of the present invention.

FIG. 1 is a functional block diagram of a vehicle information system 100 according to one embodiment of the present invention. System 100 includes a computer system 102, a vehicle information database 104 for storing vehicle related information, a user information database 106 for storing user information, a display device for 108 for displaying information to a user 101, and an input device 109 (e.g., keyboard, mouse, and/or other input device) that enables system 102 to receive input from user 101. Although database 104 and database 106 are shown as being separate, it is contemplated that a single database could be used to store both the vehicle and user information. Computer system 102 includes software 110 that enables computer system 102 to provide the features described herein.

Figure 2:
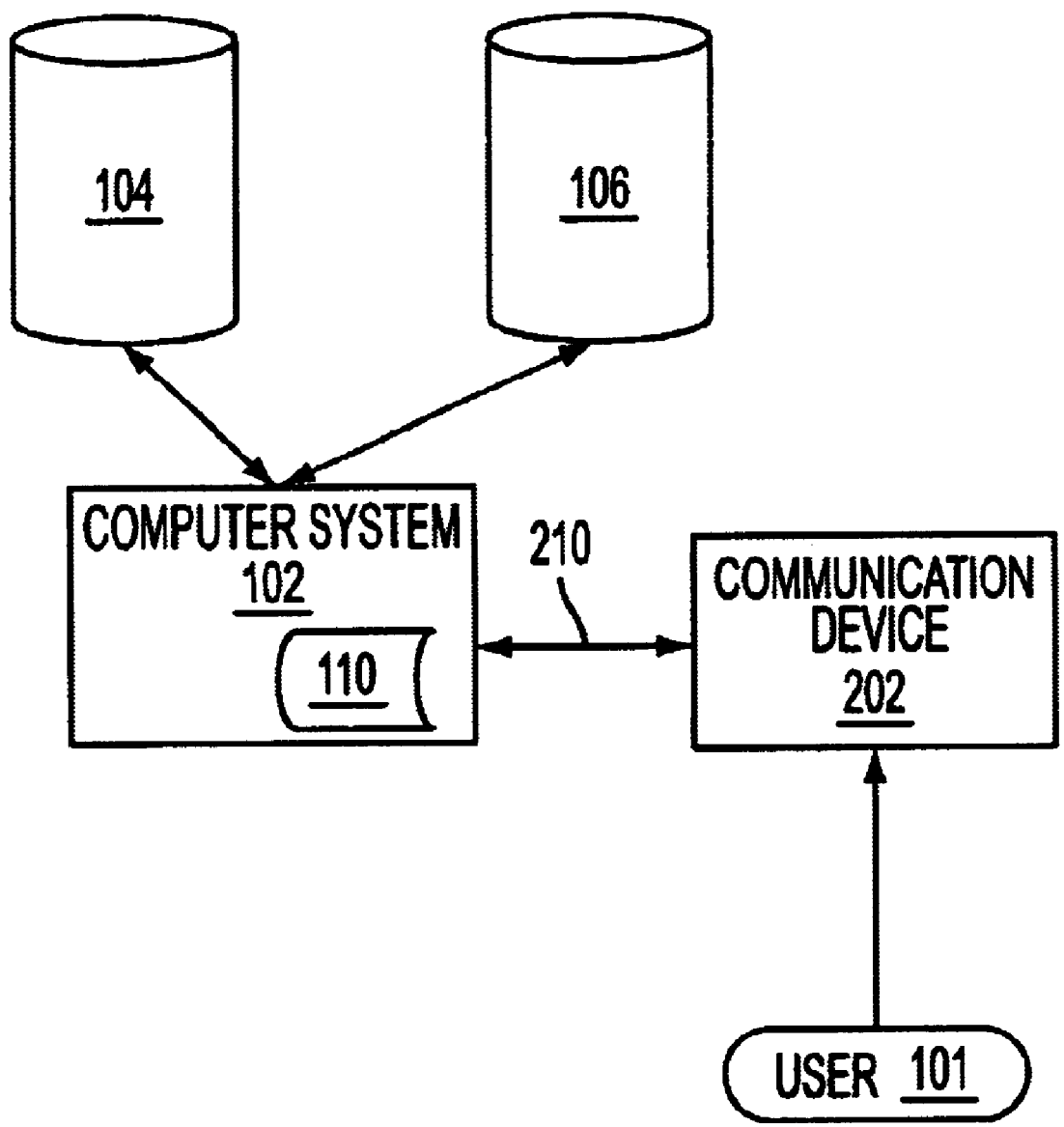
FIG. 2 is a functional block diagram of a vehicle information system according to another embodiment of the present invention.

User 101 may interact with computer system 102 directly as shown in FIG. 1 or may interact with computer system 102 indirectly by using a communication device 202 and a network 210, as shown in FIG. 2. Communication device 202 can by any device capable of sending data to and receiving data from computer system 202, such as a personal computer, mobile telephone, personal digital assistant (PDA), or other communication device. In the embodiment shown in FIG. 1, system 102 displays information (e.g., user interfaces) by transmitting the information to a display device 108, such as a computer monitor or TV screen or other display device. In the embodiment shown in FIG. 2, system 102 displays information (e.g., user interfaces) by transmitting the information to a communication device 202.

System 102 is operable to provide to user 101 vehicle related information and services. The information provided to the user includes information from a vehicle report, such as a technical service bulletin (TSB), a vehicle recall notice, a vehicle related consumer complaint, an NHTSA investigation report, and other vehicle reports. User 101 finds this information useful when user 101 finds that one of his vehicles needs to be taken into a repair shop or when user 101 is looking to purchase a motor vehicle.

Figure 3:
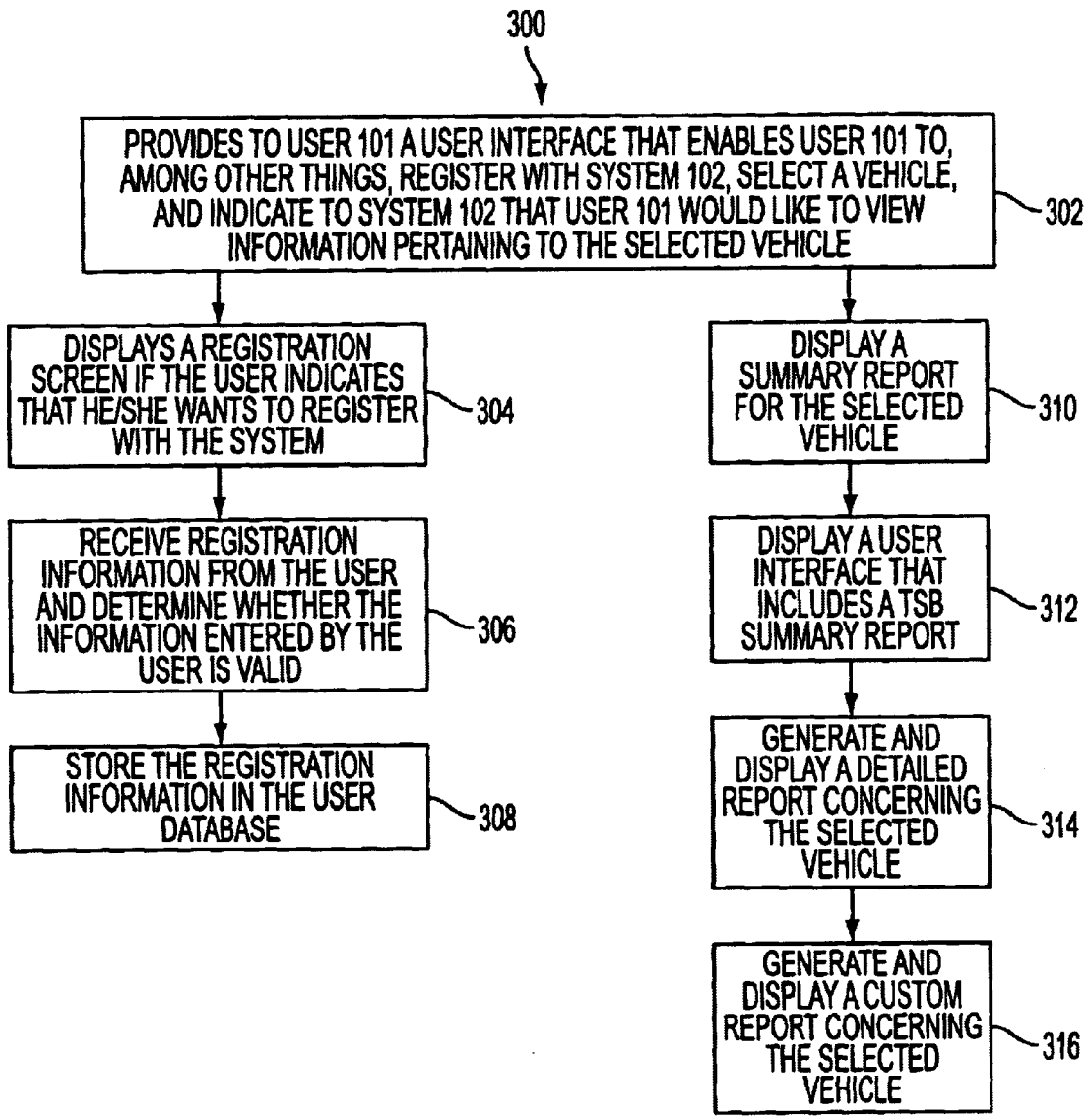
FIG. 3 is a flow chart illustrating a process according to one embodiment of the invention.

FIG. 3 illustrates a process 300, according to one embodiment, that is performed by system 102. Process 300 begins in step 302 where system 102 provides to user 101 a user interface 400 (see FIG. 4) that enables user 101, among other things, to register with system 102 and to select a vehicle and indicate to system 102 that user 101 would like to view information pertaining to the selected vehicle. User interface 400 includes, among other things, a register button 401, a vehicle selector 402 and a go button 404.

Figure 12:
FIG. 12 illustrates a registration screen according to one embodiment.

User 101 selects register button 401 when user 101 wants to register with system 102. In response to user 101 selecting register button 401, process 300 proceeds from step 302 to step 304 where system 102 displays a registration screen 1200 (see FIG. 12). Registration screen 1200 prompts user 101 to enter personal information, such as user 101's: name, address, phone number, e-mail address, password, and other personal information. When user is done entering the requested information, user 101 selects save button 1202. In response to user 101 selecting save button 1202, system 102 determines whether the information entered by user 101 is valid (step 306). That is, system 102, among other things, checks that user 101 has inputted all of the required information. If the information inputted by user 101 is valid, system 102 stores the e-mail address inputted by the user in a record in database 106 and stores the other information (also referred to as "profile information") in database 106 such that it is associated with the e-mail address (step 308). After step 308, process 900 proceeds back to step 302.

Referring again to FIG. 4, vehicle selector 402 enables user 101 to select a vehicle by make, model and year. Vehicle selector 402 includes a first pull down list 410 that enables user 101 to select a vehicle year (e.g., 2001), a second pull down list 411 that enables user 101 to select a vehicle make (e.g., Ford), and a third pull down list 412 that enables user 101 to select a vehicle model (e.g., Mustang).

Figure 6:
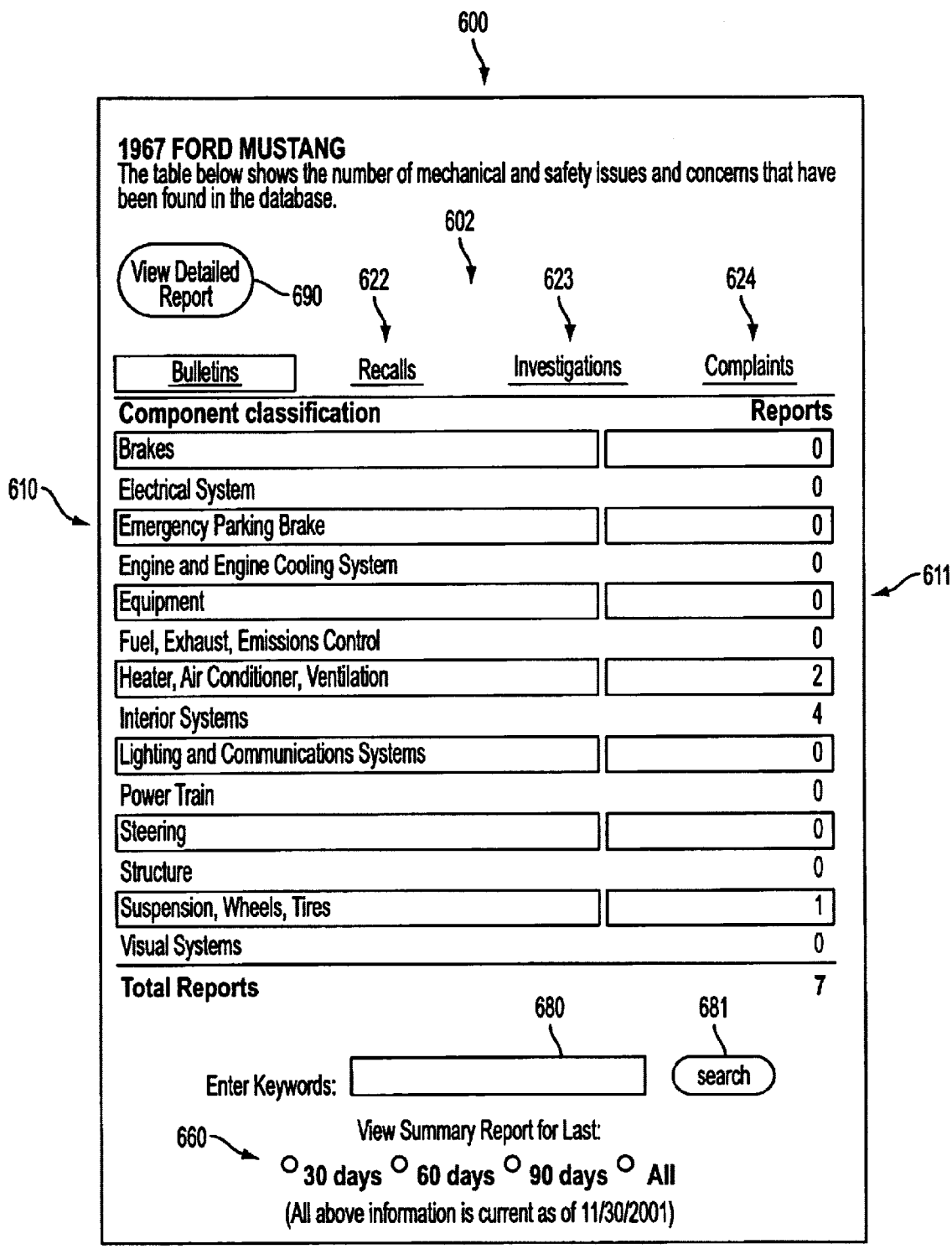
FIG. 6 illustrates a user interface that includes a summary report according to another embodiment.

After user 101 selects a vehicle using vehicle selector 402, the user can select (i.e., "click on") "Go" button 404. This will indicate to system 102 that user 101 desires to view information pertaining to the vehicle selected by user 101. In response to user 101 selecting a vehicle using vehicle selector 402 and selecting Go button 404, process 300 proceeds from step 302 to step 310 where system 102 provides a user interface 500 (see FIG. 5) that includes a summary report 502. In another embodiment, in response to user 101 selecting Go button 404, system 102 provides a user interface 600 (see FIG. 6) that includes a summary report 602 for a particular report type. For example, summary report 602 could be a TSB summary report, recall notice summary report, consumer complaint summary report, NHTSA investigation summary report, or a summary report for another report type. In the example shown in FIG. 6, the particular report type is TSB, but summary report 602 could have been for any one of the other report types. It should be noted that user 101 need not register with system 102 to view either summary report 502 or 602.

Referring now to FIG. 5, in one embodiment, summary report 502 includes information that indicates the total number of TSBs, recall notices, consumer complaints, and/or NHTSA investigations of which system 102 is aware that concern the selected vehicle. In another embodiment, summary report 502 includes information that indicates the number of TSBs, recall notices, consumer complaints, and/or NHTSA investigations of which system 102 is aware that concern the selected vehicle and that were submitted or issued within the last X days, where X is a number greater than zero. The user can select a value for X by selecting one of the check-boxes 563 displayed on user interface 500. Either embodiment of the summary report 502 provides user 101 with information about the number of reported mechanical problems and/or safety issues related to the selected vehicle.

User interface 500 includes buttons 521, 522, 523 and 524 that enable user 101 to indicate that he desires to drill down to see further information concerning the TSBs, recall notices, consumer complaints, or NHTSA investigations, respectively.

In one embodiment, in response to user 101 selecting button 521, system 102 provides user interface 600 that includes a TSB summary report 602 (step 312). TSB summary report 602 includes a table that includes a list of vehicle components 610 and a list of numbers 611. The table associates each number in list 611 with a vehicle component listed in list 610. In one embodiment, each number in number list 611 represents the number of TSBs of which system 102 is aware that concern the selected vehicle and that concern the vehicle component with which the number is associated. In another embodiment, each number in number list 611 represents the number of TSBs of which system 102 is aware that concern the selected vehicle, that concern the vehicle component with which the number is associated, and that were added to database 104 within the last X days, where X is a number greater than 0. For example, as shown in summary report 602, the number 2 is associated with the vehicle component classification called "heater, air conditioner, ventilation" and the number 4 is associated with the vehicle component classification called "Interior Systems." This indicates that system 102 is aware of 2 TSBs that concern the selected vehicles climate control system (i.e., heater, air conditioner and/or ventilation system) and is aware of 4 TSBs that concern the selected vehicles interior systems. The user can select a value for X by selecting one of the check-boxes 660 displayed on user interface 600.

Similarly, if user 101 selected one of buttons 522–524, then user interface 600 would include a recall notice summary report, a consumer complaints summary report, or an NHTSA investigations summary report, respectively. That is, the numbers in list 611 would represent the number of recall notices, consumer complaints, or NHTSA investigations, respectively, of which system 102 is aware that concern the selected vehicle and that concern the vehicle component with which the number is associated. User interface 600 also includes buttons 622–624 so that from user interface 600 user 101 can request to see any one of a recall notice summary report, a consumer complaints summary report, or an NHTSA investigations summary report, respectively.

In one embodiment, system 102 is aware of a vehicle report when database 104 either stores the content from the vehicle report or stores a pointer to the vehicle report. The pointer may be a file name, a fully qualified path name, a uniform resource locator (URL), an address in a database or memory, or other pointer.

User interface 600 enables user 101 to filter the information displayed therein based on a query string entered by the user. For example, user interface includes a text box 680 in which user 101 can input a query string and a "search" button 681. User 101 selects search button 681 after inputting a query string into box 680. In response to user 101 selecting search button 681, system 102 searches the TSBs identified in summary report 602 and displays a "filtered" summary report. The filtered summary report displays, for each component in list 610, the number of TSBs from the set of TSBs identified in summary report 602 that match the query string. For example, if the query string included the word "squeak," then, after user 101 selects search button 681, the TSB summary report 602 will indicate, for each component in list 610, the number of TSBs that were identified in summary report 602 and that include the word "squeak."

User interface 600 includes a button 690 that user 101 clicks on when user 101 wants to receive a detailed report concerning the selected vehicle. In response to user 101 selecting button 690, system 102 generates a detailed report concerning the selected vehicle, which is then displayed to user 101 (step 314). System 102, in one embodiment, generates a detailed report concerning the selected vehicle by retrieving content from one or more of the appropriate vehicle reports of which system 102 is aware and that pertain to the selected vehicle and, using the retrieved content, generates a detailed report that includes the retrieved content. The detailed report is then displayed to user 101. The vehicle reports may be stored in database 104 or elsewhere.

If summary report 602 indicates that system 102 is aware of one or more reports (e.g., TSBs) that pertain to a specific vehicle component in list 610 (e.g., Exhaust System), then user 101 can request system 102 to created a detailed report by clicking on the name of the specific vehicle component. In response to user 101 doing so, system 102 generates the detailed report and displays to user 101 the portion of the detailed report that pertains to the specific vehicle component. With this feature the user does not have to search the detailed report for the information he is looking for.

A detailed report concerning a selected vehicle includes zero or more records, wherein each record, if any, includes content from one vehicle report of a specified report type that pertains to the selected vehicle. For example, if system 102 is aware of 3 vehicle reports of a specific report type that pertain to the selected vehicle (for example, recall notices for the selected vehicle), then the detailed report would contain 3 records, with each record including content from one of the three reports. Further, the records are organized so that all records that include content from a report that pertains to a particular component are grouped together. The vehicle report type is specified by the summary report type that is displayed in user interface 600. For example, if at the time user 101 selected button 690 user interface 600 included a TSB summary report, then the detailed report will include zero or more records that include information from TSBs. Similarly, if at the time user 101 selected button 690 user interface 600 included a recall notice summary report, then the detailed report will include zero or more records that include information from recall notices.

Figure 7:
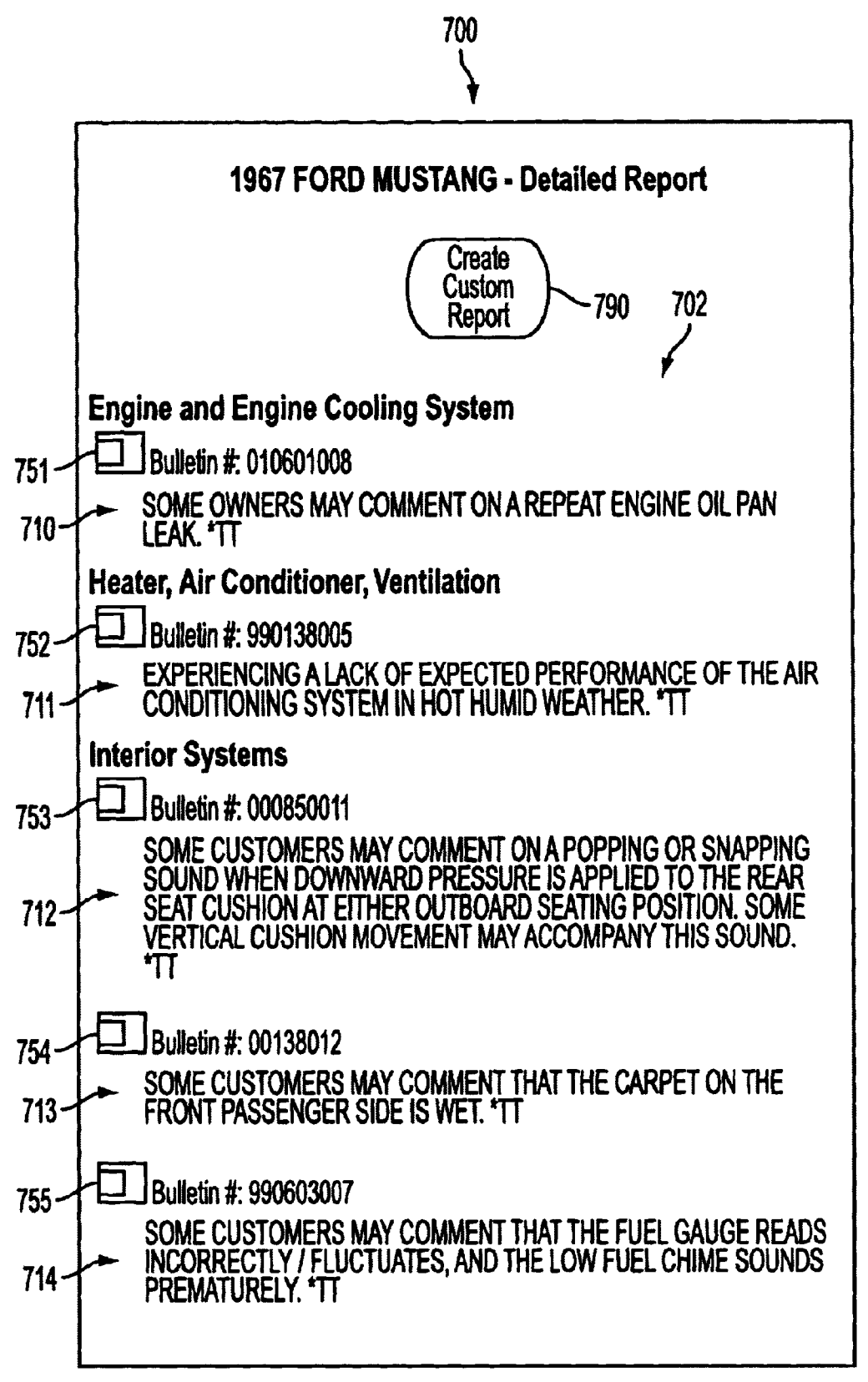

FIG. 7 illustrates an example user interface 700 for displaying a detailed report 702 according to one embodiment. As shown in FIG. 7, detailed report 702 includes five records 710–714. In this example, each of the five records includes information from a particular TSB. That is, each record is associated with a particular report. More specifically, record 710 includes information from TSB #010601008, record 711 includes information from TSB #990138005, record 712 includes information from TSB #000850011, record 713 includes information from TSB #00138012, and record 714 includes information from TSB #990603007. As further shown in FIG. 7, the records are organized so that all records that include content from a report that pertains to a particular component are grouped together.

System 102 enables user 101 to select one or more of the records in the detailed report and then request a custom report based on the selected records. This is illustrated in FIG. 7. As shown in FIG. 7, user interface 700 includes one checkbox for each record. That is, user interface 700 includes checkbox 751 for selecting record 710, checkbox 752 for selecting record 711, checkbox 753 for selecting record 712, checkbox 754 for selecting record 713, and checkbox 755 for selecting record 714. After user 101 selects one or more records by placing a mark in one or more checkboxes, user 101 may request system 102 to create a custom report based on the selected records. In the example shown in FIG. 7, user 101 requests system 102 to create a custom report by selecting button 790.

In response to receiving a request from user 101 to create a custom report, system 102 determines the records that were selected by user 101 and includes information from the vehicle reports associated with those records in a custom report, but does not include in the custom report information from the vehicle reports associated with the records that were not selected (step 316). After creating the custom report, the report is displayed to user 101. User 101 may print a copy of the custom report. FIG. 8 illustrates an example custom report 800 that was created after user 101 selected record 753 and then selected button 790. As shown in FIG. 8, the custom report 800 includes information from the vehicle report associated with record 753.

Figure 9:
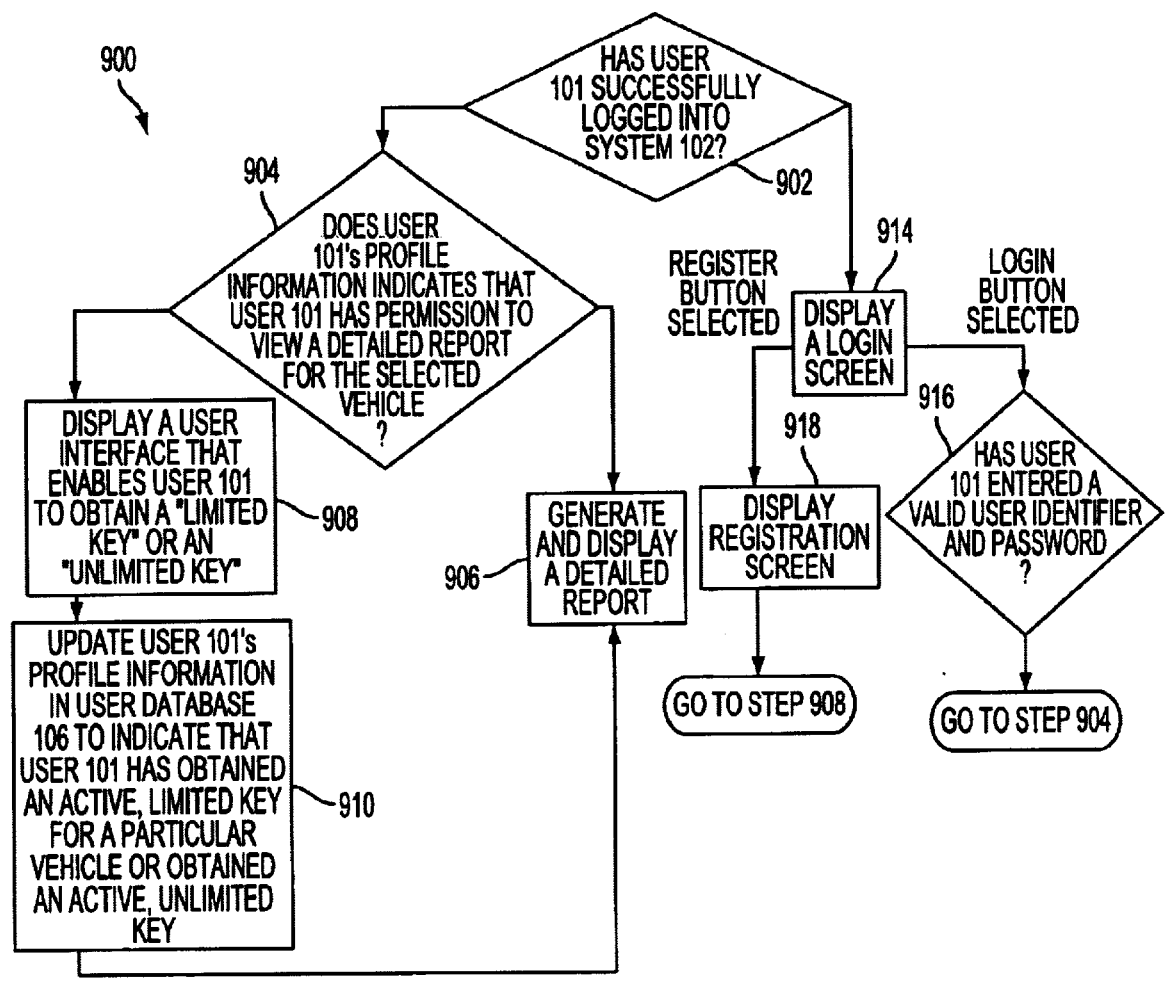
FIG. 9 is a flow chart illustrating a process according to one aspect of the invention.

Referring back to FIG. 6, in one embodiment, in response to user 101 selecting button 690 (i.e., indicating that user 101 desires to view a detailed report concerning the selected vehicle), system 102 performs process 900 (see FIG. 9).

Process 900 begins in step 902, wherein system 102 determines whether user 101 has successfully logged into system 102. If user 101 has successfully logged into system 102, this means that user 101 is a registered user of system 102. For each registered user of system 102, system 102 maintains profile information for the user in user database 106. The profile information for a user includes, among other things, the registration information inputted by user 101 and information that indicates the vehicles, if any, for which the user may view a detailed report. If system 102 determines that user 101 has successfully logged into system 102, the process 900 proceeds to step 904, otherwise it proceeds to step 914.

In step 904, system 102 access user database 106 to determine whether user 101's profile information indicates that user 101 has permission to view a detailed report for the selected vehicle. In one embodiment, user 101's profile information will indicate that user 101 has permission to view a detailed report if the profile information indicates that user 101 is in possession of an active, limited, virtual key to the selected vehicle or an active, unlimited, virtual key. If system 102 determines that user 101's profile information indicates that user 101 currently does not have permission to view a detailed report for the selected vehicle, process 900 proceeds to step 908, otherwise process 900 proceeds to step 906. In step 906, system 102 generates a detailed report as described above with reference to step 314 of process 300.

Figure 10:
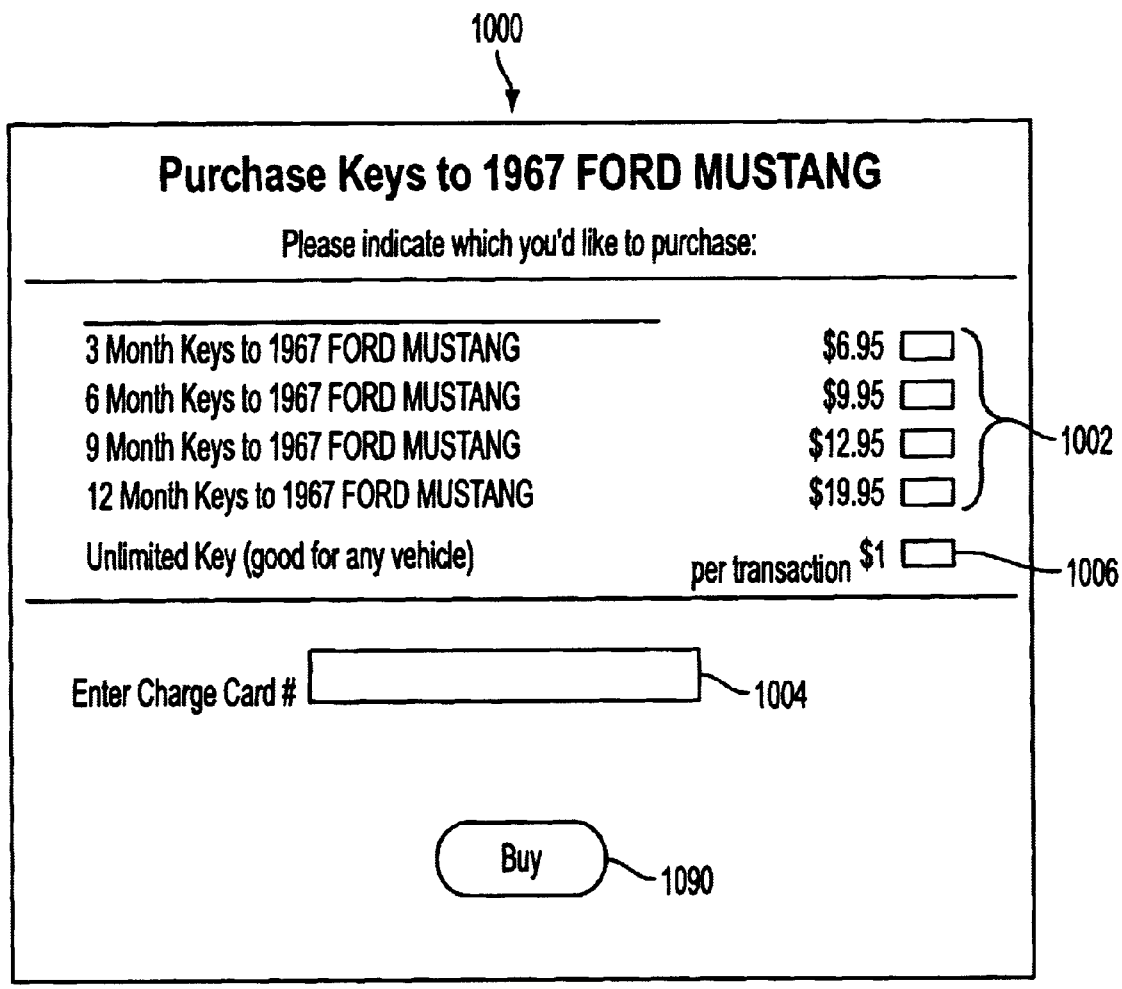
FIG. 10 illustrates a user interface for enabling a user to purchase a key according to one embodiment.

In step 908, system 102 displays a user interface 1000 (see FIG. 10) that enables user 101 to obtain a "limited key" or an "unlimited key." Once user 101 obtains a limited key to the selected vehicle or an unlimited key, then, as long as the key obtained by user 101 is active, user 101's profile information will indicate that user 101 has permission to view a detailed report pertaining to the selected vehicle.

User 101 obtains a limited key to the selected vehicle by selecting one of the checkboxes 1002 displayed on user interface 1000 and entering a charge card number into text box 1004. System 102 charges the charge card number the amount of money associated with the checkbox selected by user 101. A limited key is only active for a certain period of time and only works with one vehicle, which is the vehicle that was selected at the time user 101 obtained the key. The period of time during which the key is active is determined by the amount of money paid by user 101 for the limited key. For example, for $12, user 101 can obtain a limited key for the selected vehicle that is active for 3 months from the date of purchase, and for $20, user 101 can obtain a limited key for the selected vehicle that is active for 6 months from the date of purchase.

User 101 obtains an unlimited key by selecting checkbox 1006 and entering a charge card number into text box 1004. This authorizes system 102 to charge a set amount of money to the charge card number every time system 102 generates a detailed report for user 101 and/or every time system 102 sends an enhanced notification to user 101. Unlike a limited key, which is only active for a set period of time and which only works with one vehicle, an unlimited key is active as long as system 102 is able to post charges to the charge card number and works with any vehicle, not just one vehicle.

User 101 selects buy button 1090 after user has selected a key. In response, system 102 verifies that the charge card number is valid and then stores the selected key in user database 106 and associates the key with the selected vehicle and the user's user identifier (i.e., system 102 updates user 101's profile information in user database 106 to indicate that user 101 has obtained an active limited key for a particular vehicle or obtained an active unlimited key) (step 910). After step 910 control passes to step 906.

Figure 11:
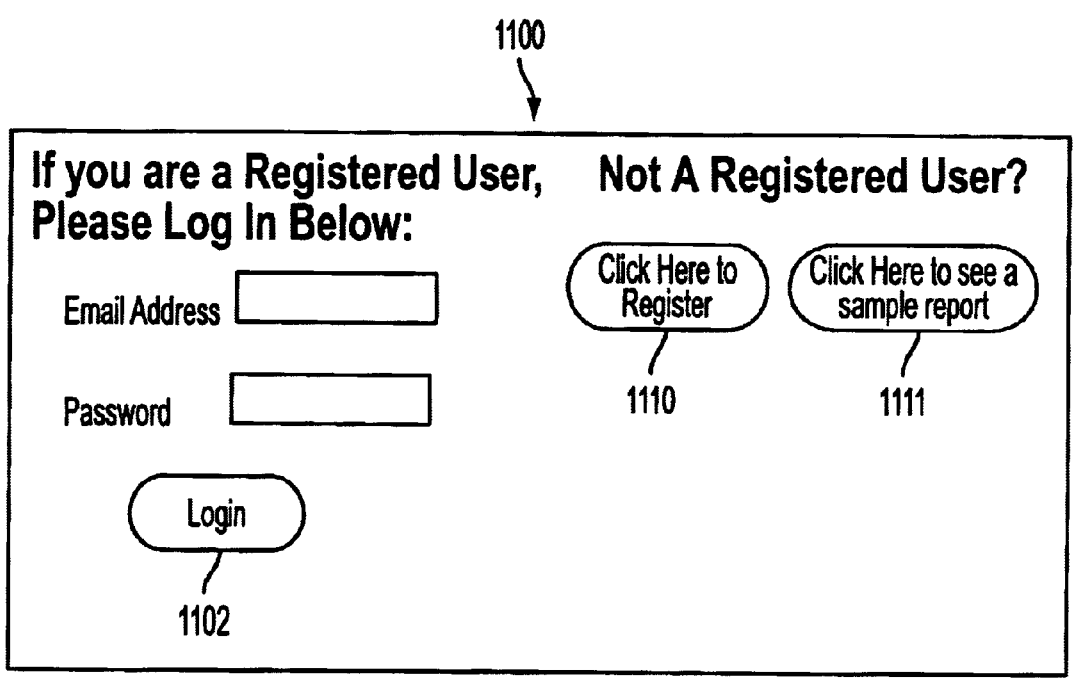
FIG. 11 illustrates an example log in screen.

In step 914, system 102 displays a login screen 1100 (see FIG. 11). At this point, if user 101 is a registered user of system 102, then user 101 enters his user identifier (e.g., e-mail address) and password into the login screen 1100 and selects login button 1102. If user 101 is not a registered user, then user 101 may begin the process of registering with system 102 by selecting the "click here to register" button 1110, or user may view a sample detailed report by selecting button 1111. If user 101 selects login button 1102, then process 900 proceeds to step 916, if user 101 selects register button 1110, then process 900 proceeds to step 918, and if user 101 selects button 1111, a sample detailed report is displayed for the user.

In step 916, system 102 determines whether user 101 entered a valid user identifier and password. If user 101 entered an invalid user identifier and/or password, then system 102 generates an error message informing user 101 that either the user identifier or password are invalid and the process returns to step 914. If user 101 entered a valid user identifier and password, then process 900 returns to step 904.

In step 918, system 102 displays registration screen 1200 so that user 101 may register with system 102. If user 101 chooses not to register with system 102, process 900 ends, otherwise process 900 proceeds back to step 908.

As discussed in the summary section of this document, system 102 provides to registered users certain functionality that is not available to non-registered users. For example, system 102 provides every registered user with a "virtual garage." That is, for each registered user, system 102 keeps track of each vehicle that was selected by the user after the user logged into system 102 by storing this information in database 106 and associating the information with the user's user identifier (e.g., e-mail address). In this way, after a registered user logs onto system 102, system 102 can display a list that contains each vehicle ever selected by the user when the user was logged into system 102.

User 101 can log into system 102 by selecting "Login" button 420 on user interface 400. In response to user 101 selecting button 420, system 102 displays login screen 1100. At this point, user 101 enters his user identifier (e.g., e-mail address) and password into the login screen 1100 and selects login button 1102. In response to user 101 selecting button 1102, system 102 determines whether user 101 entered a valid user identifier and password. If user 101 entered a valid user identifier and/or password, then system 102 determines whether there are any vehicles in user 101's virtual garage. If there are vehicles in the virtual garage, system 102 selects one of the vehicles (e.g., the first vehicle that was placed in the garage) and displays a user interface 1300 (see FIG. 13), otherwise system 102 displays user interface 400.

From user interface 400, user 101 can select a vehicle using vehicle selector 402. After selecting a vehicle, user 101 can select Go button 404, which indicates that user 101 desires to see a summary report regarding the selected vehicle. In response to receiving the indication from user 101, system 102 adds the selected vehicle to user 101's virtual garage (i.e., system 102 adds the selected vehicle to a vehicle list or table in database 106 that is associated with user 101's user identifier) and then displays user interface 1300.

Referring now to FIG. 13, user interface 1300 is identical to user interface 600 with the exception that interface 1300 includes indicators 1310 and 1311 and buttons 1320–1322, whereas interface 600 does not include these buttons. As shown in FIG. 13, interface 1300 includes a TSB summary report 602 for the selected vehicle (i.e., the vehicle selected by user 101 or the vehicle selected by system 102). User interface 1300 also displays other information concerning the vehicle. For example user interface 1300 displays indicators 1310 and 1311 that inform user 101 as to whether user 101 has an active key associated with the selected vehicle and whether e-mail notifications have been activated for the selected vehicle, respectively. Interface 1300 also includes the following selectable buttons: edit button 1320 and my garage button, and if indicator 1310 indicates that user 101 does not have a key for the selected vehicle, purchase key button 1322 is also included, otherwise it is not included. Additionally, interface 1300 includes consumer complaints button 624, recall notices button 622, and investigations button 623 so that from user interface 1300 user 101 can request to see any one of a recall notice summary report, a consumer complaints summary report, or an NHTSA investigations summary report, respectively.

Edit button 1320 is selected by user 101 when user 101 desires to input into system 102 information about the selected vehicle and/or when user 101 desires to receive vehicle related notifications from system 102. That is, system 102 provides a notification service to which any registered user may subscribe. In response to user 101 selecting edit button 1320, system 102 displays a vehicle edit screen 1400.

Vehicle edit screen 1400 enables user 101 to input into system 102 information about the selected vehicle. For example, as shown in FIG. 14, vehicle edit screen 1400 enables user to input the following information: the date the vehicle was purchased, the date when the vehicle's oil was changed last, the date when the tires where last rotated, the date the vehicle's warranty expires, the mileage when the vehicle's warranty expires, the number of miles currently on the vehicle, an estimate of the number of miles per year that the vehicle is expected to driven, and an indication of whether the vehicle is new or used.

Edit Screen 1400 also enables user 101 to indicate whether he or she desires to receive from system 102 notifications concerning the vehicle in questions and how he or she would like to receive the notifications. There are at least four types of notifications that user 101 may receive from system 102. These four types of notifications are: a summary report notifications, a warranty expiration reminder notifications, vehicle maintenance reminder notifications, and alert notifications.

Figure 14:
FIG. 14 illustrate a vehicle edit screen according to one embodiment.

As shown in FIG. 14, user 101 may elect to receive the notifications by e-mail, regular mail, and/or telephone. In one embodiment, system 102 provides these notifications to user 101 free of charge. For example, by selecting the appropriate checkboxes on screen 1400, user 101 can indicate that he or she desires to receive summary report notifications by e-mail, warranty reminder notifications by regular mail, and alert notifications by e-mail and telephone.

If user 101 elects to receive the summary report notification for the selected vehicle, then system 102 periodically or occasionally sends to user 101 a summary report concerning the vehicle. The summary report includes the same information as that which is included in summary report 502, TSB summary report 602, consumer complaint summary report, NHTSA investigations summary report, and/or recall notice summary report.

If user 101 elects to receive the vehicle maintenance reminder notifications for the selected vehicle, then system 102 sends, at the appropriate point in time, notifications to user 101 that remind user 101 that he should take his vehicle into the shop for scheduled maintenance. If the notification is sent via e-mail or regular mail, a discount coupon from a service center in the vicinity of the user may be included with the notification. The operator of system 102 may receive a fee for each coupon displayed, clicked on, downloaded, printed and/or redeemed. Preferably, the discount coupon includes an identifier that identifies system 102 as the provider of the coupon to user 101. Consequently, it is expected that the operator of system 102 will enter into an agreement with a service center, wherein the operator of system 102 agrees to distribute discount coupons that are redeemable only at the service center in exchange for the service center paying the operator a fee for each coupon redeemed at the service center that was distributed by operator of system 102.

For most vehicles, the manufacturer of the vehicle recommends that certain maintenance be performed at certain times or when certain events occur. For example, a manufacturer may recommend that the oil be changed about every 5,000 miles. System 102 stores in database 104 information concerning one or more manufacturers' recommended maintenance schedules and uses this information in conjunction with vehicle related information inputted by user 101 in screen 1400 to provide the vehicle maintenance reminder notification service. That is, system 102 calculates the appropriate point in time to send a reminder notification for a vehicle by using the recommended maintenance schedule provided by the manufacturer of the vehicle and vehicle information inputted by user 101. For example, if the manufacturer recommends that the oil be changed every 5,000 miles and user 101 inputs into system 102 that he drives an average of 1,000 miles a month and that the oil was last changed one month ago, then system 102 can estimate when user 101 will need to get another oil change. In this example, system 102 will estimate that user 101 will need an oil change in about 4 months from when user inputted the information into system 102.

If user 101 selects to receive the warranty expiration reminder notifications for the selected vehicle, then system 102 sends, at the appropriate point in time, a notification to user 101 that reminds user 101 that the vehicle's warranty is about to expire. In one embodiment, system 102 uses the warranty term information and vehicle related information inputted by user 101 into screen 1400 to determine the appropriate point in time in which to send the notification, and in another embodiment system 102 receives the warranty term information from a third party, as opposed to receiving it from user 101. The warranty expiration reminder notification may also include information about purchasing an extended warranty and may contain hyperlinks to affiliated vendors of such warranties.

If user 101 selects to receive alert notifications for the selected vehicle, system 102 periodically determines whether a report (e.g., a TSB, recall notice, consumer complaint, or investigation report) concerning the vehicle has been submitted or issued since a given point in time and, immediately or soon after determining that such a report has been submitted or issued, transmitting a notification to user 101, wherein the notification informs user 101 that the report has been submitted and may include content from the report. User 101 can configure the system to send alerts only if a certain type of report has been submitted or issued. For example, one user may only want to receive an alert notification if the vehicle has been recalled (i.e., a recall notice was issued), whereas another user may want to receive an alert notification if a recall notice or TSB has been issued.

In one embodiment, system 102 is operable to provide user 101 an enhanced notification service for the selected vehicle provided that user 101 is in possession of an active key (limited or unlimited) for the selected vehicle. In other words, user 101 must pay for the enhanced notification service in one embodiment. Under the enhanced notification service, user 101 may elect to receive any combination of: enhanced summary report notifications, enhanced vehicle maintenance reminder notifications, enhanced warranty expiration reminder notifications, and enhanced alert notifications. For example, if user 101 has an active key for the selected vehicle, then interface 1400 includes checkboxes that enable user 101 to elect to receive one or more of the enhanced notifications.

The enhanced summary report notifications for a vehicle include the same information that is included in the basic summary report notifications plus additional information. The additional information may include content from recently issued reports concerning the vehicle. For example, an enhanced summary report notification may include a summery report as described above plus content from one or more TSBs, recall notices, consumer complaints, and/or NHTSA investigation reports that were included in database 104 since the last time a summary report notification was sent to user 101. In this way, user 101 is automatically kept informed of mechanical and/or safety issues concerning his vehicles.

The enhanced vehicle maintenance reminder notifications for a vehicle include the same information that is included in the basic vehicle maintenance reminder notifications plus additional information. The additional information may include information that informs user 101 of the vehicle's common mechanical issues that user 101 should ask the repair shop to check and/or content from recently issued vehicle reports concerning the vehicle. For example, an enhanced vehicle maintenance reminder notification may include a message that reminds user 101 that he should take his vehicle to the dealer to get the tires rotated and a message that informs user 101 that he may want to have the mechanic check the rear brake pads for premature wearing because that is a common problem with the type of vehicle that user 101 owns.

The enhanced warranty expiration reminder notifications for a vehicle include the same information that is included in the basic warranty expiration reminder notifications plus additional information. The additional information may include information that informs user 101 of the vehicle's common mechanical issues that user 101 should ask the repair shop to check and/or content from recently issued vehicle reports concerning the vehicle.

The enhanced alert notifications for a vehicle include the same information that is included in the basic alert notifications plus additional information. The additional information may include the name and address of the nearest repair shops where the vehicle may be taken to get fixed and/or a hyperlink to web page from which user 101 can schedule an appointment with the repair shops. If the alert notification was triggered by a recall notice being issued for the vehicle, the additional information may include some or all of the contents of the recall notice.

When user 101 selects a save button 1402 displayed on screen 1400, the information and notification selections inputted by user 101 into screen 1400 are stored by system 102 in user database 106 and associated with user 101's user identifier so that the information is associated with user 101.

Figure 15:
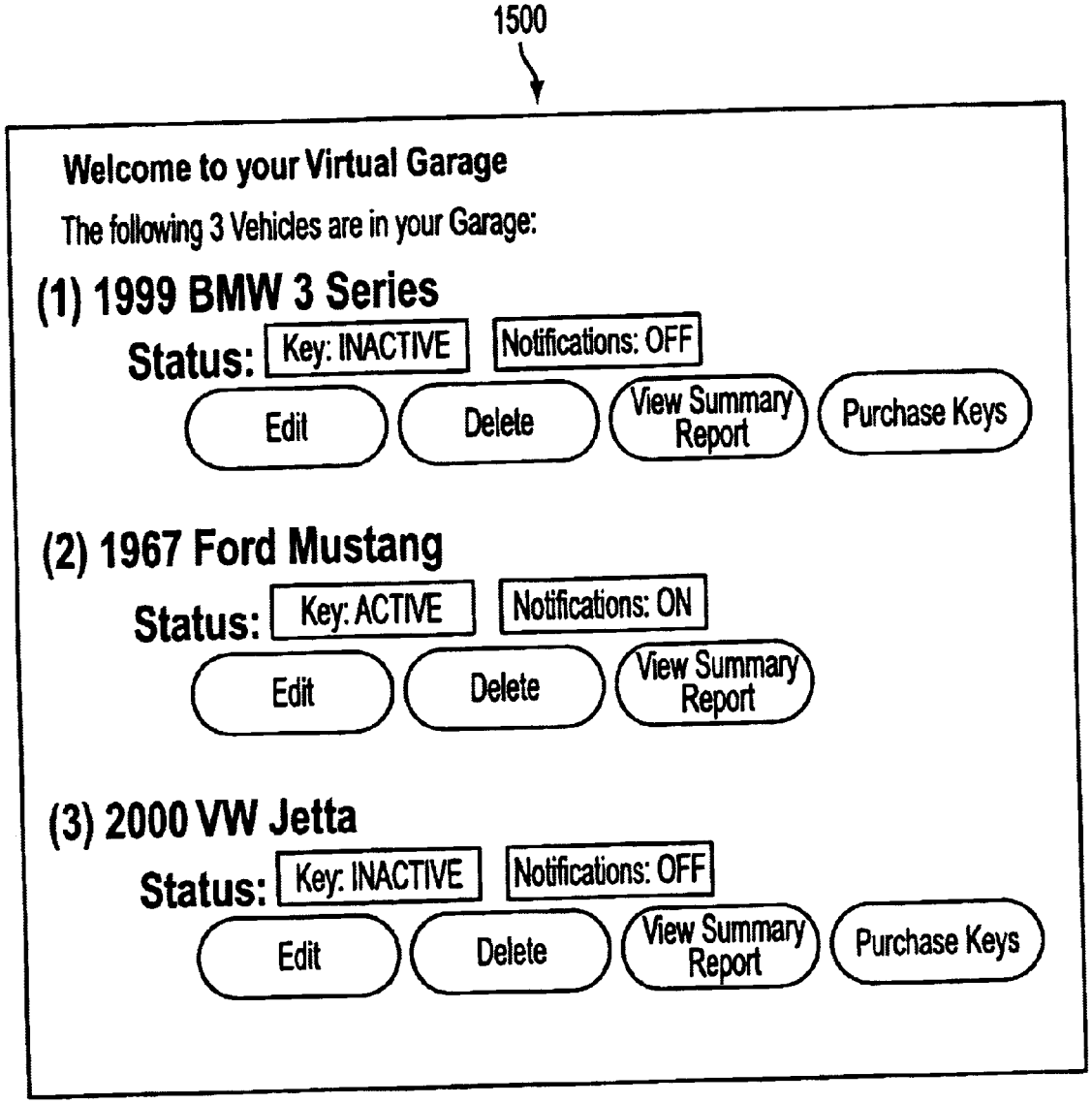
FIG. 15 illustrates an exemplary user interface that is used for displaying the vehicles in a user's virtual garage.

Referring again to FIG. 13, in response to user 101 selecting my garage button 1321, system 102 displays a list of the vehicles that have been placed in user 101's virtual garage. FIG. 15 illustrates an exemplary user interface 1500 that is generated by system 102 for displaying the vehicles in user 101's virtual garage. As shown in FIG. 15, user interface 1500 includes a list of vehicles. In this example, three vehicles are listed: (1) a 1999 BMW 3 Series; (2) a 1967 Ford Mustang; and (3) a 2000 VW Jetta. This means that, at some point in time when user 101 was logged into system 102, user 101 selected each of these three vehicles using a vehicle selector provided by system 102 (such as vehicle selector 402).

In addition to displaying the list of vehicles, user interface 1500 displays status information for each vehicle in the list. As shown in FIG. 15, user interface 1500 displays status information for each vehicle that indicates whether user 101 is in possession of an active key for the vehicle and that indicates whether user 101 has selected to receive notifications for the vehicle.

User interface 1500 additionally includes an edit button, a delete button, and a view summary report button for each vehicle in the list. If user 101 selects a delete button, then system 102 removes the vehicle associated with the delete button from the virtual garage (i.e., removed from a list of vehicles that is maintained in user database 106). If user 101 selects a view summary report button, then system 102 uses interface 1300 to display a summary report for the vehicle associated with the selected button. If user 101 selects an edit button, then system 102 retrieves the information inputted by user 101 for the vehicle associated with the selected edit button and displays the retrieved information using edit screen 1400. This enables user 101 to edit the information displayed in edit screen 1400 and to change his notification selections. For example, if user 101 selected the edit button associated with the 1967 Ford Mustang, then system 102 retrieves from database 106 the information about this vehicle that user 101 inputted into system 102 using edit screen 1400.

User interface 1500 also includes a purchase key button for each vehicle in the list for which user 101 does not possess an active key. If user 101 selects a purchase key button, then system 102 displays user interface 1000, which enables user 101 to purchase a key for the vehicle associated with the selected purchase key button.

Referring again to FIG. 13, in response to user 101 selecting purchase key button 1322, system 102 displays interface 1000. And in response to user 101 selecting button 690, system 102 displays a sample detailed report using interface 700 if user 101 does not have an active key for the selected vehicle or displays an actual detailed report using interface 700 if user 101 has an active key for the selected vehicle.

Figure 4:
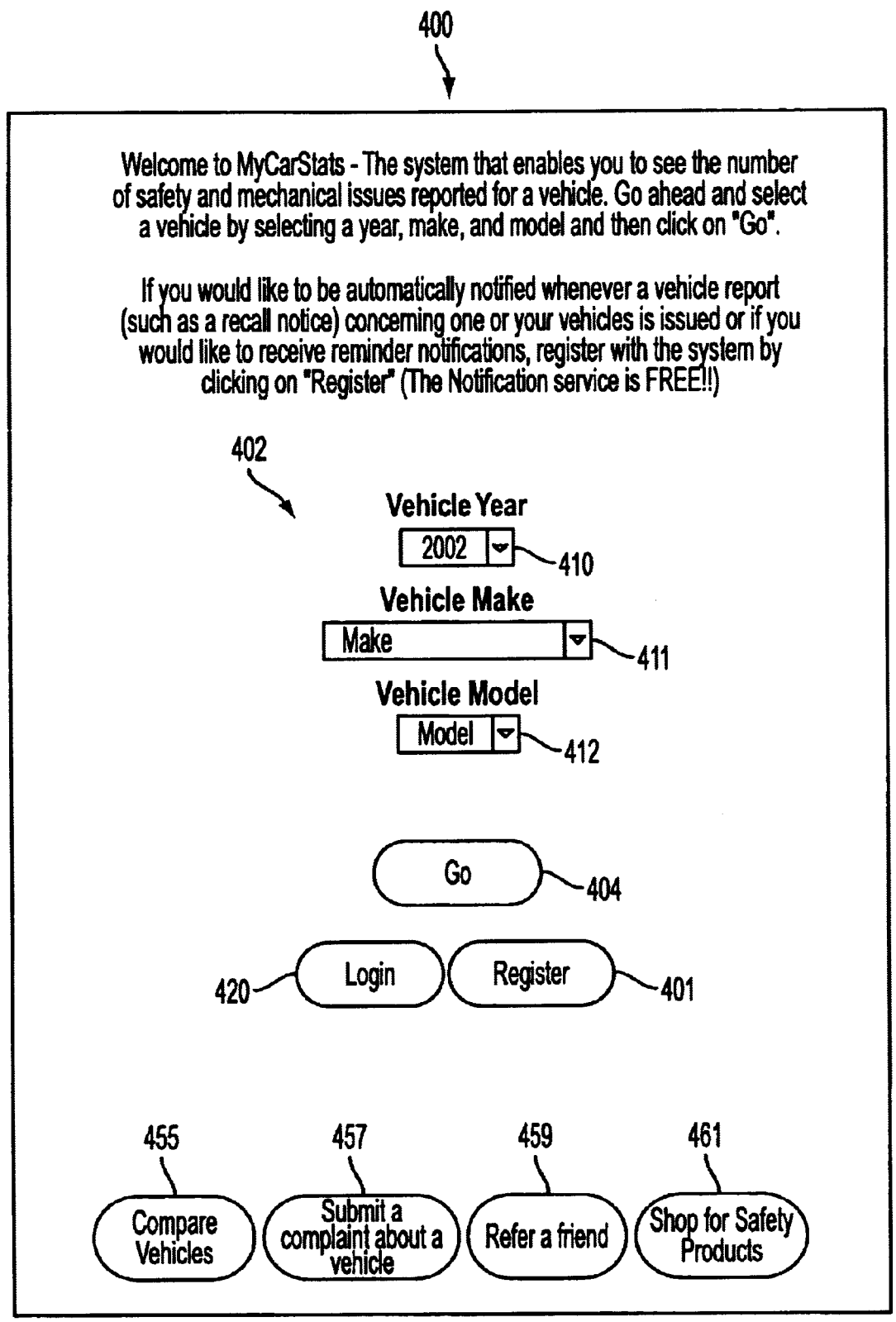
FIG. 4 illustrates a user interface that includes a vehicle selector.

Referring back to FIG. 4, another feature of system 102 is that the system is operable to enable the user to compare two or more vehicles to each other. This is a useful feature if the user is in the market to buy a new or used vehicle. As shown in FIG. 4, user interface 400 includes a compare vehicles button 455. User 101 selects button 455 when user 101 want to compare two or more vehicles. In response to user 101 selecting button 455, system 102 displays user interface 1600 (see FIG. 16). User interface 1600 includes at least two vehicle selectors that enable the user to select a first vehicle by year, make, and model, and select a second vehicle by year, make and model. After the user makes his vehicle selections and selects compare button 1690, system 102 generates and displays a comparison report 1700 (see FIG. 17). The comparison report includes information concerning the specifications of the first vehicle and information concerning the specifications of the second vehicle. The comparison report also includes information that indicates the number of TSBs, recall notices, investigation reports, and/or consumer complaints of which system 102 is aware for the first and second vehicles.

In order for system 102 to provide the features mentioned above, system 102 obtains from one or more third parties vehicle reports, such as TSBs, consumer complaints, NHTSA investigations, and recall notices. For example, in one embodiment, system 102 obtains TSBs, consumer complaints, NHTSA investigations, and recall notices from databases provided by the NHTSA. In other embodiments, consumer complaints are not only obtained from the NHTSA consumer complaint database, but from other publicly accessible complaint databases, such as, the Complaints.com complaint database (see www.complaints.com), the eComplaints.com database (see www.ecomplaints.com), and other complaint databases.

Figure 18:
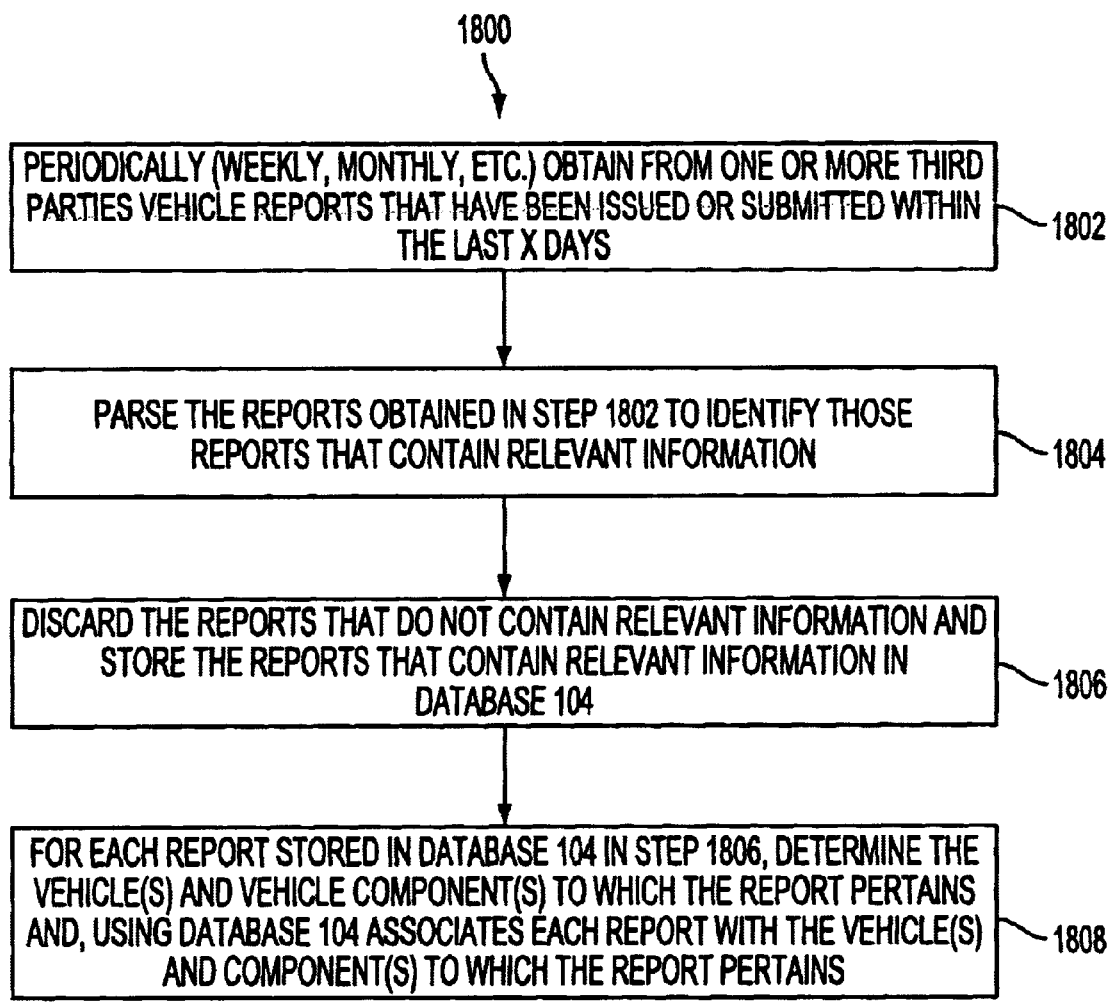
FIG. 18 is a flow chart illustrating a process for gathering vehicle reports according to one embodiment.

FIG. 18 is a flow chart illustrating a process 1800 that is performed by system 102, in one embodiment, for gathering vehicle reports. Process 1800 begins in step 1802, where system 102 periodically (weekly, monthly, etc.) obtains from one or more third parties vehicle reports that have been issued or submitted within the last X days, where X days is preferably the number of days since system 102 last obtained vehicle reports from the third parties. Next (step 1804), system 102 parses the reports obtained in step 1802 to identify those reports that contain relevant information. For example, system 102 identifies the reports that contain information by identifying those reports that include one or more predetermined keywords. Next (step 1806), system 102 discards the reports that do not contain relevant information and stores the reports that contain relevant information in database 104. A report is "stored" in database 104 if the contents of the report are stored in database 104 or if a pointer to the contents of the report is stored in database 104. Next (step 1808), for each report stored in database 104 in step 1806, system 102 determines the vehicle(s) and vehicle component(s) to which the report pertains and, using database 104, associates each report with the vehicle(s) and component(s) to which the report pertains. For example, system 102 maintains a list of vehicle reports for each component of a particular vehicle, wherein the list includes only the vehicle reports that pertain to the component of the particular vehicle. This enables system 102 to quickly and easily determine all of the reports that pertain to a particular vehicle and all the reports that pertain to a particular component of a particular vehicle.

Figure 19:
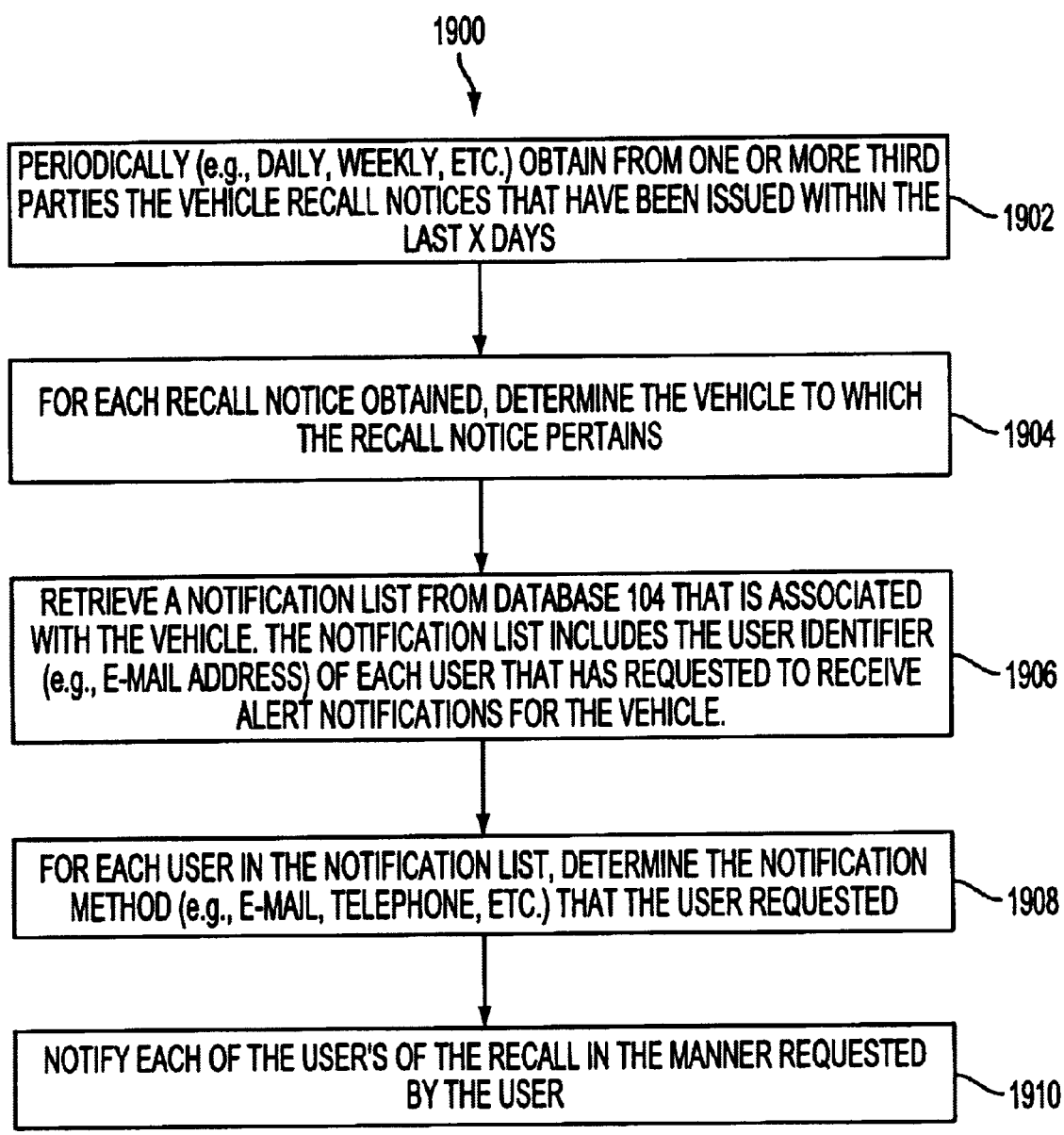
FIG. 19 is a flow chart illustrating a process for sending alert notifications according to one embodiment.

FIG. 19 is a flow chart illustrating a process 1900 that is performed by system 102, in one embodiment, for sending recall notice alert notifications. It is apparent to one skilled in the art the process 1900 can be modified for sending TSB, consumer complaint, and/or investigation report alert notifications. Process 1900 begins in step 1902, where system 102 periodically (e.g., daily, weekly, etc.) obtains from one or more third parties the vehicle recall notices that have been issued within the last X days, where X days is preferably the number of days since system 102 last obtained recall notices from the third parties. Next (step 1904), for each recall notice obtained, system 102 determines a vehicle to which the recall notice pertains. Next (step 1906), system 102 retrieves a notification list (not shown) from database 104 that is associated with the vehicle. The notification list includes the user identifier (e.g., e-mail address) of each user that has requested to receive alert notifications for the vehicle. Next (step 1908), for each user in the notification list, system 102 access the user's profile information stored in user database 106 to determine the notification method (e.g., e-mail, telephone, etc.) that the user requested. Next (step 1910), system 102 notifies each of the user's of the recall in the manner requested by the user. For example, system 102 may send an e-mail notification to one user, place a telephone call to a second user and play a pre-recorded message, and, for a third user, system 102 may do both.

Figure 20:
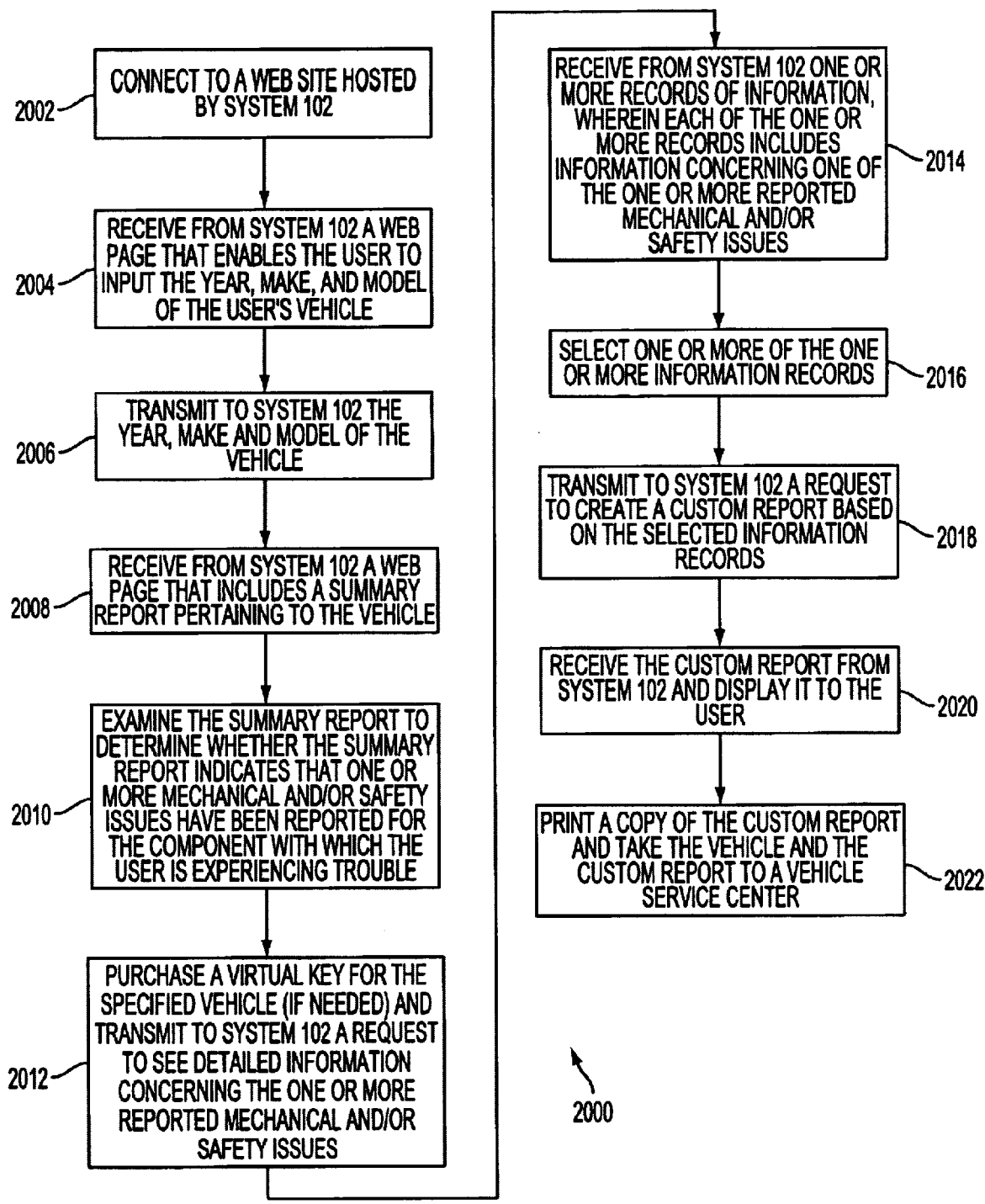
FIG. 20 is a flow chart illustrating a process designed to be performed by a vehicle owner who is experiencing trouble with a component of his vehicle.

FIG. 20 is a flow chart illustrating a process 2000 that is designed to be performed by a vehicle owner (also referred to as "user") who is experiencing trouble with a component of his vehicle. Process 2000 begins in step 2002, where the user uses a communication device 202 to connect to a web site hosted by system 102 after noticing that there is something wrong with the user's vehicle. Next (step 2004) the user's communication device receives from system 102 a web page that enables the user to input the year, make, and model of the user's vehicle. Next (step 2006), the user uses the communication device to transmit to system 102 the year, make and model of the vehicle. Next (step 2008), the user's communication device receives from system 102 a web page that includes a summary report pertaining to the vehicle (i.e., make, model, and year) specified by the user. Next (step 2010) the user examines the summary report to determine whether the summary report indicates that one or more mechanical and/or safety issues have been reported for the component with which the user is experiencing trouble. Next (step 2012), if the user determines that the summary report indicates that one or more mechanical and/or safety issues have been reported for the component in issue, then the user purchases a virtual key for the specified vehicle if the user does not already possess an active virtual key for the specified vehicle and uses the communication device to transmit to system 102 a request to see detailed information concerning the one or more reported mechanical and/or safety issues. Next (step 2014), the user's communication device 202 receives from system 102 one or more records of information, wherein each of the one or more records of information includes information concerning one of the one or more reported mechanical and/or safety issues. Next (step 2016), the user selects one or more of the one or more information records. Next (step 2018) the user uses the communication device 202 to transmit to system 102 a request to create a custom report based on the selected information records. Next (step 2020), the user's communication device 202 receives the custom report from system 102 and displays it to the user. Next (step 2022), the user prints a copy of the custom report and takes the vehicle and the custom report to a vehicle service center.

Referring again to FIG. 4, interface 400 may include buttons 457, 459, and 461. Button 457 enables user 101 to submit a complaint to the NHTSA. In one embodiment, when user 101 selects button 457, system 102 (or communication device 202) connects to a system (e.g., web site) operated by the NHTSA, requests a complaint form the system, receives the complaint form, and displays the complaint form to user 101. At this point, user 101 can fill in the requested information, which is then sent to the NHTSA system by communication device 202 or system 102. In one embodiment, when user 101 selects button 459, system 102 displays a form that requests user 101 to input an e-mail address of a friend or some other person. Once user 101 inputs the e-mail address, system 102 is operable to send to the e-mail address an e-mail that advertises features of system 102. In this way, user 101 can easily and quickly inform a friend of the valuable features provided by system 102. In one embodiment, when user 101 selects button 461, system 102 displays a user interface (not shown) that enables user 101 to purchase vehicle related safety items.

While various illustrative embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. A computer implemented method for providing to users selected vehicle related safety and mechanical issues information, the method comprising the steps of:
   providing a user interface that enables a user to select at least one vehicle;
   obtaining at least two types of vehicle safety and mechanical issues information report types;
   supplying to the user safety and mechanical issues information relevant to the at least one selected vehicle, wherein the step of supplying comprises the step of displaying to the user summary statistics by report type; and
   storing for a user warranty information associated with a selected vehicle and automatically notifying the user prior to when the user's warranty or a portion of the warranty is scheduled to expire, wherein the step of automatically notifying the user further comprises providing the user with a basic warranty expiration reminder for free, and providing the user with an enhanced warranty expiration reminder if the user has paid a fee.

2. The method of claim 1 further comprising the step of the user conducting a key word or key phrase search of the summary statistics.

3. The method of claim 1 wherein the reports include information related to specific vehicle components, and the step of supplying to the user safety and mechanical issues information relevant to the at least one selected vehicle comprises the step of displaying to the user expanded statistics by component type.

4. The method of claim 3 further comprising the step of the user conducting a key word or key phrase search of the expanded statistics.

5. The method of claim 1 wherein the reports include information related to specific components, and the step of supplying to the user safety and mechanical issues information relevant to the at least one selected vehicle comprises the step of displaying to the user detailed reports by component type.

6. The method of claim 5 further comprising the step of the user conducting a key word or key phrase search of the detailed reports.

7. The method of claim 1 wherein the step of supplying to the user safety and mechanical issues information relevant to the at least one selected vehicle comprises the step of displaying to the user a custom report.

8. The method of claim 1 comprising the step of automatically notifying the user when a new report is available for the at least one selected vehicle.

9. The method of claim 1, wherein the user interface enables the user to select a vehicle by enabling the user to select one or more of a vehicle year, a vehicle make, and a vehicle model.

10. The method of claim 1, wherein the summary statistics comprises the number of reports of each report type that relate to the at least one vehicle.

11. The method of claim 1 wherein the report types include one or more of technical service bulletins, recall reports, NHTSA investigations and consumer complaints and other report types.

12. The method of claim 1, wherein the summary statistics comprises the number of reports of each report type that relate to the at least one vehicle that have been issued within a predetermined time period.

13. The method of claim 1 further comprising the step of the user entering information about when the user's warranty or portion of a warranty expires for the at least one vehicle.

14. The method of claim 1 wherein the enhanced warranty expiration reminder includes information regarding mechanical issues relating to the vehicle.

15. The method of claim 1 wherein the enhanced warranty expiration reminder includes information regarding mechanical issues relating to the vehicle, where such information is obtained from vehicle reports.

16. The method of claim 1 wherein the notifying step includes information about purchasing an extended warranty.

17. The method of claim 1 wherein the notifying step includes information about purchasing an extended warranty and a hyperlink to a vendor of such warranty.

18. The method of claim 1 wherein the notification is sent to a terminal device of the user.

19. The method of claim 18 wherein the terminal device comprises one or more of an email enabled device, a facsimile device; a telephone, a PDA, and a pager.

20. The method of claim 1 further comprising the step of the user creating a personalized notification service and specifying how the notification should be made.

21. A computer implemented method for providing to users selected vehicle related safety and mechanical issues information, the method comprising the steps of:
   providing a user interface that enables a user to select at least one vehicle;
   obtaining at least two types of vehicle safety and mechanical issues information report types;
   supplying to the user safety and mechanical issues information relevant to the at least one selected vehicle, wherein the step of supplying comprises the step of displaying to the user summary statistics by report type; and storing for a user warranty information associated with a selected vehicle and automatically notifying the user prior to when the user's warranty or a portion of the warranty is scheduled to expire, wherein the step of automatically notifying the user further comprises providing the user with a basic warranty expiration reminder for free, and providing the user with an enhanced warranty expiration reminder if the user has subscribed to an enhanced notification service.

22. The method of claim 21 further comprising the step of the user conducting a key word or key phrase search of the summary statistics.

23. The method of claim 21 wherein the reports include information related to specific vehicle components, and the step of supplying to the user safety and mechanical issues information relevant to the at least one selected vehicle comprises the step of displaying to the user expanded statistics by component type.

24. The method of claim 23 further comprising the step of the user conducting a key word or key phrase search of the expanded statistics.

25. The method of claim 21 wherein the reports include information related to specific components, and the step of supplying to the user safety and mechanical issues information relevant to the at least one selected vehicle comprises the step of displaying to the user detailed reports by component type.

26. The method of claim 25 further comprising the step of the user conducting a key word or key phrase search of the detailed reports.

27. The method of claim 21 wherein the step of supplying to the user safety and mechanical issues information relevant to the at least one selected vehicle comprises the step of displaying to the user a custom report.

28. The method of claim 21 comprising the step of automatically notifying the user when a new report is available for the at least one selected vehicle.

29. The method of claim 21, wherein the user interface enables the user to select a vehicle by enabling the user to select one or more of a vehicle year, a vehicle make, and a vehicle model.

30. The method of claim 21, wherein the summary statistics comprises the number of reports of each report type that relate to the at least one vehicle.

31. The method of claim 21 wherein the report types include one or more of technical service bulletins, recall reports, NHTSA investigations and consumer complaints and other report types.

32. The method of claim 21, wherein the summary statistics comprises the number of reports of each report type that relate to the at least one vehicle that have been issued within a predetermined time period.

33. The method of claim 21 further comprising the step of the user entering information about when the user's warranty or portion of a warranty expires for the at least one vehicle.

34. The method of claim 21 wherein the enhanced warranty expiration reminder includes information regarding mechanical issues relating to the vehicle.

35. The method of claim 21 wherein the enhanced warranty expiration reminder includes information regarding mechanical issues relating to the vehicle, where such information is obtained from vehicle reports.

36. The method of claim 21 wherein the notifying step includes information about purchasing an extended warranty.

37. The method of claim 21 wherein the notifying step includes information about purchasing an extended warranty and a hyperlink to a vendor of such warranty.

38. The method of claim 21 wherein the notification is sent to a terminal device of the user.

39. The method of claim 38 wherein the terminal device comprises one or more of an email enabled device, a facsimile device; a telephone, a PDA, and a pager.

40. The method of claim 21 further comprising the step of the user creating a personalized notification service and specifying how the notification should be made.

* * * * *